(12) United States Patent
Kojima et al.

(10) Patent No.: US 12,416,920 B2
(45) Date of Patent: Sep. 16, 2025

(54) INFORMATION PROCESSING APPARATUS AND INFORMATION PROCESSING METHOD

(71) Applicant: SONY GROUP CORPORATION, Tokyo (JP)

(72) Inventors: Kohei Kojima, Tokyo (JP); Mitsuteru Matsunaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 447 days.

(21) Appl. No.: 17/802,957

(22) PCT Filed: Feb. 18, 2021

(86) PCT No.: PCT/JP2021/006073
§ 371 (c)(1),
(2) Date: Aug. 28, 2022

(87) PCT Pub. No.: WO2021/177043
PCT Pub. Date: Sep. 10, 2021

(65) Prior Publication Data
US 2023/0086153 A1     Mar. 23, 2023

(30) Foreign Application Priority Data
Mar. 4, 2020   (JP) ................. 2020-036522

(51) Int. Cl.
*G05D 1/00*    (2024.01)
*G06V 40/16*   (2022.01)
*G06V 40/20*   (2022.01)

(52) U.S. Cl.
CPC ......... *G05D 1/0214* (2013.01); *G05D 1/0274* (2013.01); *G06V 40/161* (2022.01); *G06V 40/25* (2022.01)

(58) Field of Classification Search
None
See application file for complete search history.

(56) References Cited

U.S. PATENT DOCUMENTS

| | | | |
|---|---|---|---|
| 11,327,503 B2* | 5/2022 | Deyle | G06V 20/58 |
| 11,618,162 B2* | 4/2023 | Cristache | B25J 9/1697 |
| | | | 700/245 |

(Continued)

FOREIGN PATENT DOCUMENTS

| | | |
|---|---|---|
| JP | 2001-082966 A | 3/2001 |
| JP | 2009110495 A | 5/2009 |

(Continued)

OTHER PUBLICATIONS

International Search Report and Written Opinion of PCT Application No. PCT/JP2021/006073, issued on May 18, 2021, 09 pages of ISRWO.

*Primary Examiner* — Anand P Bhatnagar
(74) *Attorney, Agent, or Firm* — CHIP LAW GROUP

(57) ABSTRACT

The present technique relates to an information processing apparatus, an information processing method, and a program capable of easily setting a highly-reliable entry prohibited area. An information processing apparatus according to one aspect of the present technique sets a parameter of each area used for an action plan for a mobile object on the basis of a person's recognition state during movement estimated by people flow data. The present technique may be applied to an information processing apparatus that controls an autonomous mobile robot.

14 Claims, 20 Drawing Sheets

(56) References Cited

U.S. PATENT DOCUMENTS

| | | | | |
|---|---|---|---|---|
| 11,688,171 | B2* | 6/2023 | Carranza | G06V 20/62 |
| | | | | 382/103 |
| 11,720,111 | B2* | 8/2023 | Deyle | G01S 5/0249 |
| | | | | 700/245 |
| 11,782,452 | B2* | 10/2023 | Deyle | G05D 1/0246 |
| | | | | 700/255 |
| 11,819,997 | B2* | 11/2023 | Deyle | G08B 13/19647 |
| 12,125,377 | B2* | 10/2024 | Shionozaki | G08G 1/0112 |
| 2022/0266446 | A1* | 8/2022 | Cristache | G06N 5/04 |
| 2023/0033781 | A1* | 2/2023 | Deyle | G01C 21/3453 |
| 2023/0350415 | A1* | 11/2023 | Deyle | G01S 13/931 |
| 2024/0037951 | A1* | 2/2024 | Carranza | G06T 7/292 |
| 2024/0085924 | A1* | 3/2024 | Cristache | H04W 12/72 |

FOREIGN PATENT DOCUMENTS

| | | |
|---|---|---|
| JP | 2009-157735 A | 7/2009 |
| JP | 2009-198454 A | 9/2009 |
| JP | 2017-090796 A | 5/2017 |
| JP | 2019-079247 A | 5/2019 |
| JP | 2019138448 | 7/2019 |
| JP | 2021022181 A | 2/2021 |

\* cited by examiner

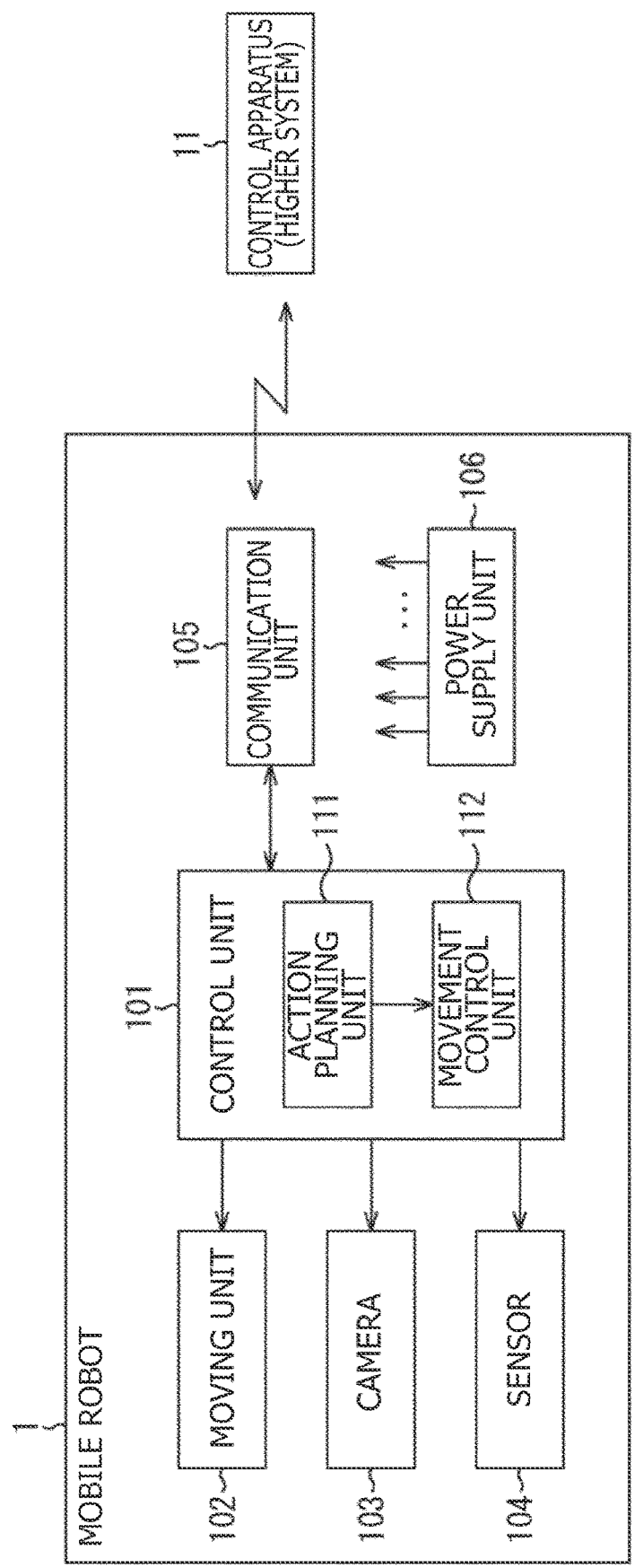
F I G. 14

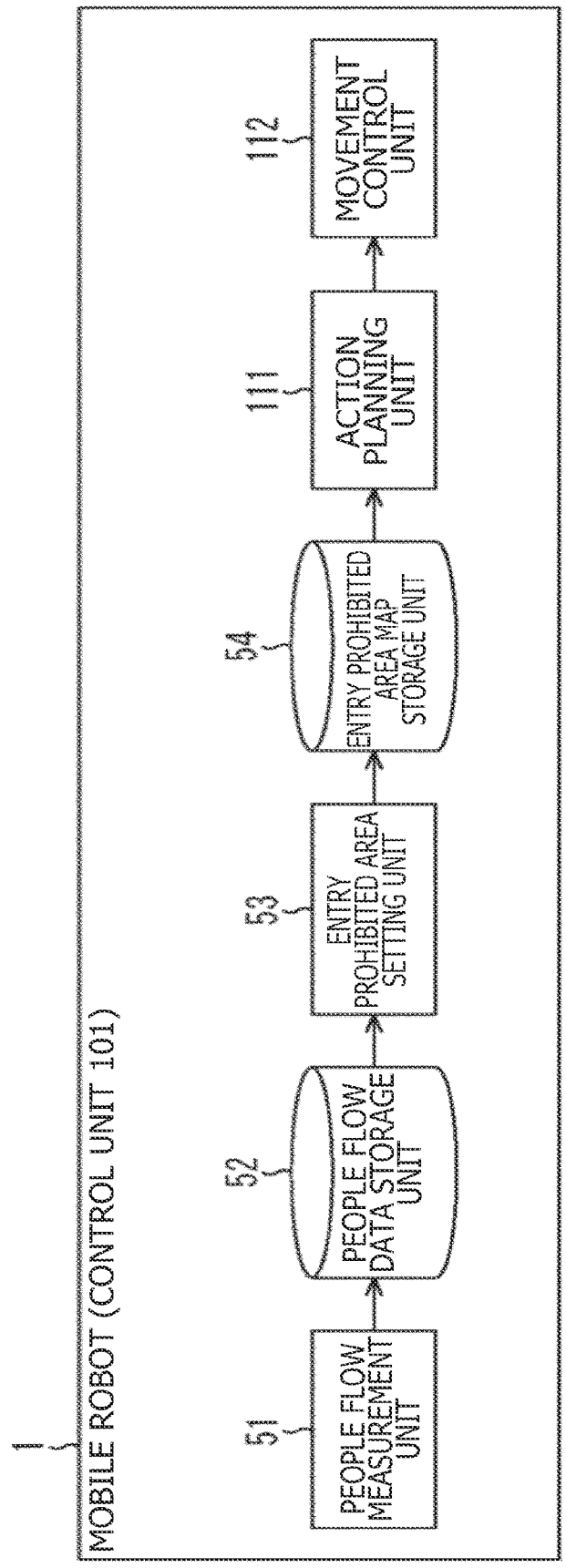

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/006073 filed on Feb. 18, 2021, which claims priority benefit of Japanese Patent Application No. JP 2020-036522 filed in the Japan Patent Office on Mar. 4, 2020. Each of the above-referenced applications is hereby incorporated herein by reference in its entirety.

TECHNICAL FIELD

The present technique relates particularly to an information processing apparatus, an information processing method, and a program capable of easily setting a highly-reliable entry prohibited area.

BACKGROUND ART

In a space where an autonomous mobile robot is introduced, an entry prohibited area is set for the following conditions.
- To make it possible to plan an efficient and safe trajectory in consideration of a known fixed obstacle such as a wall.
- In accordance with user requirements, a system administrator sets an area that the robot should not enter.
- In order to prevent a malfunction, the vicinity of an obstacle that is difficult to detect by a sensor is set to be an entry prohibited area.
- As a rule of a space, there is an area that the robot should not enter.

Setting appropriate entry prohibited areas individually is troublesome and complicated work. Therefore, various techniques have been proposed for automatically setting the entry prohibited area.

For example, PTL 1 discloses a technique in which the position of a person is measured for a certain period of time, and an area where a person does not enter is set to be an entry prohibited area. In this technique, processing is performed in such a manner that all the areas are set as the entry prohibited areas, and then the potential of an area where a person has existed is lowered to exclude the area from the entry prohibited areas.

CITATION LIST

Patent Literature

PTL 1
Japanese Patent Laid-Open No. 2017-90796

SUMMARY

Technical Problem

In a case of the technique described in PTL 1, a large amount of walking data is required to set a highly-reliable entry prohibited area. In addition, in a case where the distribution of people is low in density, only the vicinity of the center of the space tends to be treated as a passable area. Further, an area where a person entered by mistake is set as a passable area.

The present technique has been developed in view of such a situation, and enables to easily set a highly-reliable entry prohibited area.

Solution to Problem

An information processing apparatus according to one aspect of the present technique includes a parameter setting unit that sets a parameter of each area used for an action plan for a mobile object on the basis of a person's recognition state during movement estimated by people flow data.

In one aspect of the present technique, a parameter of each area used for an action plan for a mobile object is set on the basis of a person's recognition state during movement estimated by people flow data.

BRIEF DESCRIPTION OF DRAWINGS

FIG. 14 is a block diagram for illustrating a configuration example of the mobile robot.

FIG. 20 is a block diagram for illustrating another configuration example of the information processing system.

DESCRIPTION OF EMBODIMENTS

Figure 1:
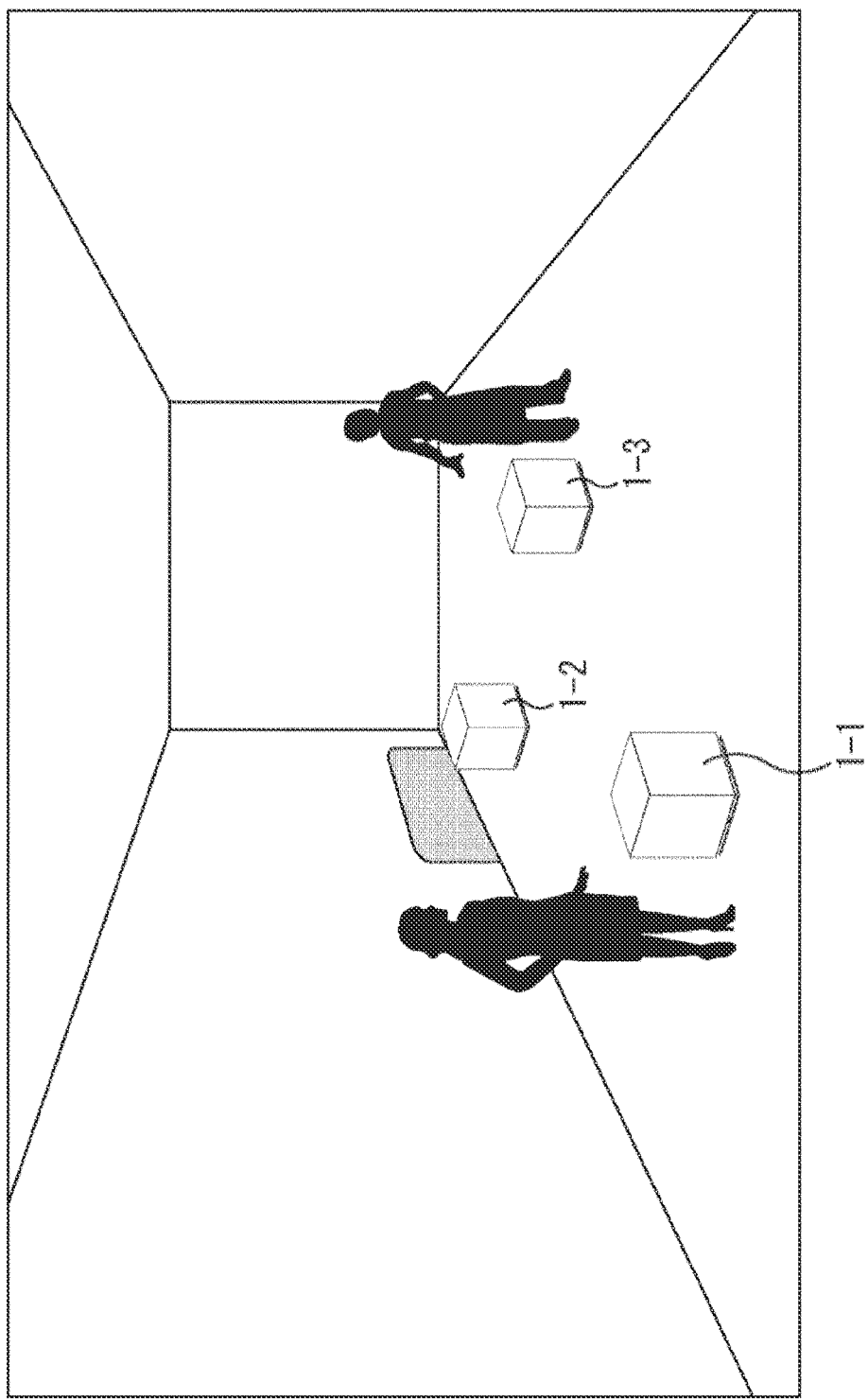
FIG. 1 is a diagram for illustrating a state of use of mobile robots according to an embodiment of the present technique.

Hereinafter, modes for carrying out the present technique will be described. The description will be given in the following order.

1. Outline of setting of entry prohibited area
2. Configuration example of each apparatus
3. First embodiment: basic form
4. Second embodiment: countermeasure to case of incorrect potential update
5. Third embodiment: setting of weight parameter according to environment
6. Fourth embodiment: automatic adjustment of weight parameter using additional information
7. Fifth embodiment: three-dimensional countermeasure by considering posture of person
8. Other Outline of Setting of Entry Prohibited Area FIG. 1 is a diagram for illustrating a state of use of mobile robots according to an embodiment of the present technique.

The mobile robots according to an embodiment of the present technique is used in, for example, a room. The space where the mobile robots are introduced is a space that people can walk through.

In the example of FIG. 1, mobile robots 1-1 to 1-3 are illustrated. In a case where it is not necessary to distinguish the mobile robots from each other, they are appropriately and collectively referred to as a mobile robot 1. Configurations such as tires used for moving the mobile robot 1 are provided on the bottom surface of the mobile robot 1 having a cubic casing.

The mobile robot 1 is an autonomous travelling robot having a function of searching for a person in a room on the basis of an image or the like photographed by a camera, and approaching the person detected by the search to serve or communicate.

An entry prohibited area is set in the space where the mobile robot 1 moves. For example, an area around an obstacle is set as the entry prohibited area. The area other than the entry prohibited area becomes a passable area.

The entry prohibited area is set by, for example, a control apparatus that is a higher apparatus for managing the movement of the mobile robot 1. In the mobile robot 1, an action plan to move while avoiding the entry prohibited area set by the control apparatus is performed, and the movement is carried out according to the planned trajectory (route).

The action plan in the mobile robot 1 is performed by, for example, a potential method. The potential method is a method in which attractive potential is set to a destination, repulsive potential is set to an area where an obstacle is present, and the robot is moved along a negative gradient of the potential function.

The setting of the entry prohibited area by the control apparatus is performed on the basis of an estimation result of a person's recognition state obtained by estimating the person's recognition state for each area of a space on the basis of the behavior of the person. The person's recognition state is estimated on the basis of people flow data preliminarily measured by tracking each of many people who move in a space, or the like. The behavior of a person used to estimate the person's recognition state is the movement of the person.

As will be described later, the people flow data includes information such as the movement trajectory, velocity, acceleration, and jerk of a person. The people flow data is generated, for example, by analyzing an image photographed by a camera installed near a ceiling of a space where the mobile robot 1 moves. It should be noted that the jerk is a rate of change of acceleration to time.

The control apparatus calculates a velocity vector, an acceleration vector, and a jerk vector when each person moves on the basis of the people flow data when setting the entry prohibited area. The control apparatus estimates the person's recognition state on the basis of the calculated information, and sets the entry prohibited area on the basis of the estimation result.

The person's recognition state is represented as follows by three pieces of information such as the velocity vector, the acceleration vector, and the jerk vector. A relation between the person's recognition state and each of the velocity vector, acceleration vector, and jerk vector is defined as a policy used to set potential.

Figure 2:
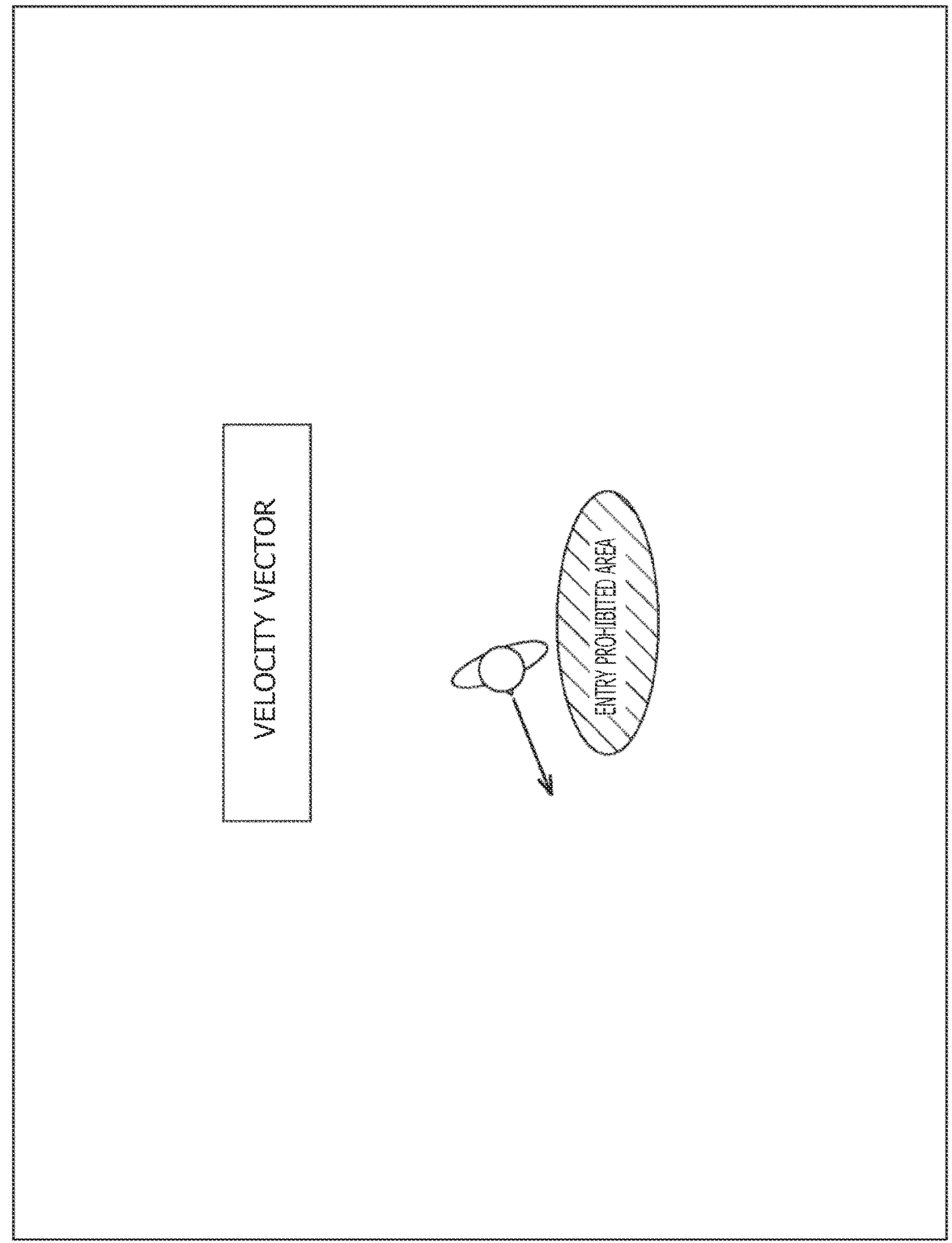
FIG. 2 is a diagram for illustrating a relation between a velocity vector and a person's recognition state.

FIG. 2 is a diagram for illustrating a relation between the velocity vector and the person's recognition state.

It is rare for a person who recognizes an area serving as the entry prohibited area to move in the normal direction to the entry prohibited area. That is, the person who recognizes the entry prohibited area moves in a direction different from the normal direction of the entry prohibited area as illustrated by an arrow in FIG. 2. According to the velocity vector, it is estimated that the person's recognition state is in the state of recognizing the entry prohibited area located in a direction different from the direction of the velocity vector.

Figure 3:
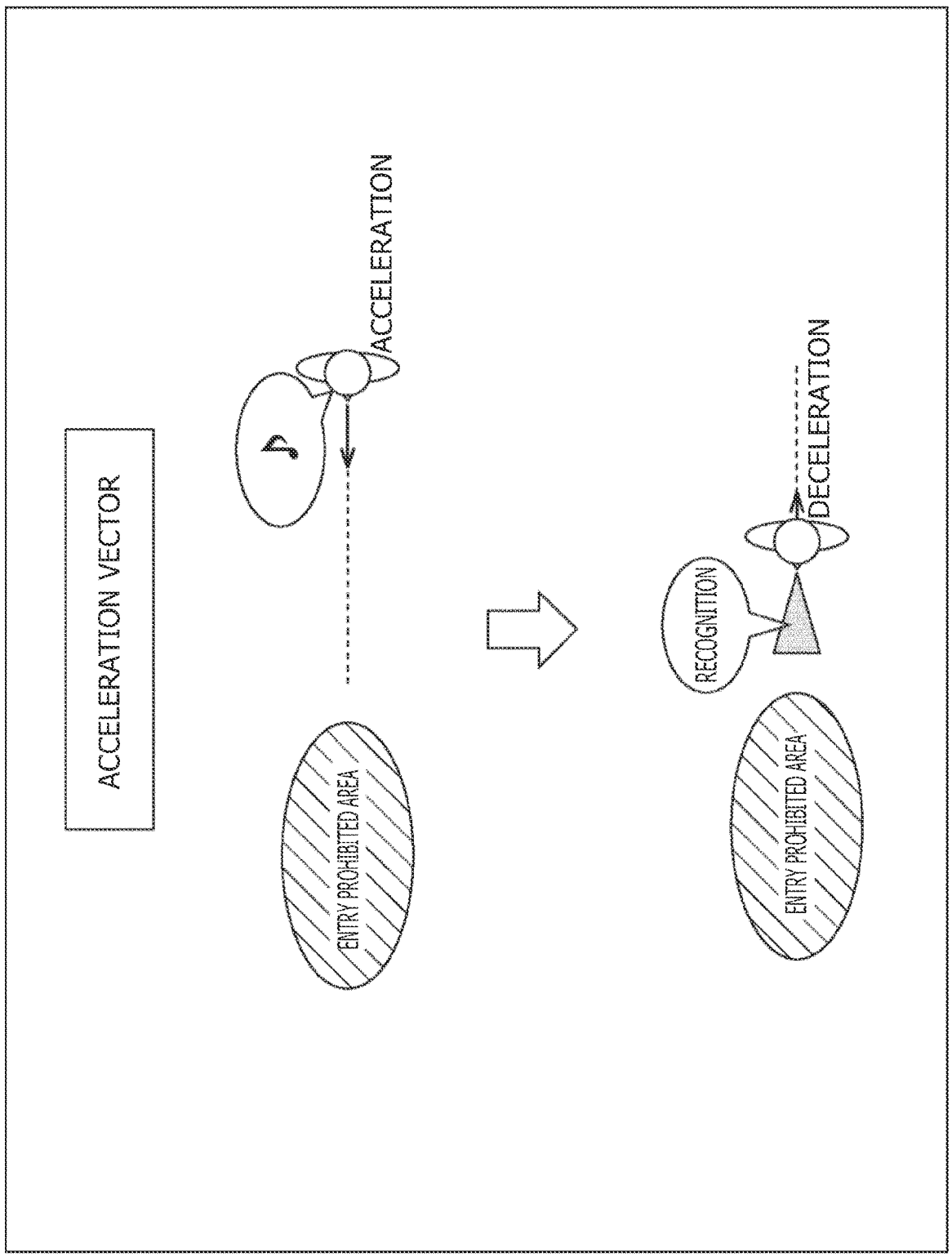
FIG. 3 is a diagram for illustrating a relation between an acceleration vector and the person's recognition state.

FIG. 3 is a diagram for illustrating the relation between the acceleration vector and the person's recognition state.

A person decelerates when approaching the recognized entry prohibited area. That is, as illustrated in the upper part of FIG. 3, a person who is moving towards the entry prohibited area decelerates when recognizing the entry prohibited area as illustrated in the lower part of FIG. 3. According to the acceleration vector during deceleration, it is estimated that the person's recognition state is in the state of recognizing the entry prohibited area located in the travelling direction.

Figure 4:
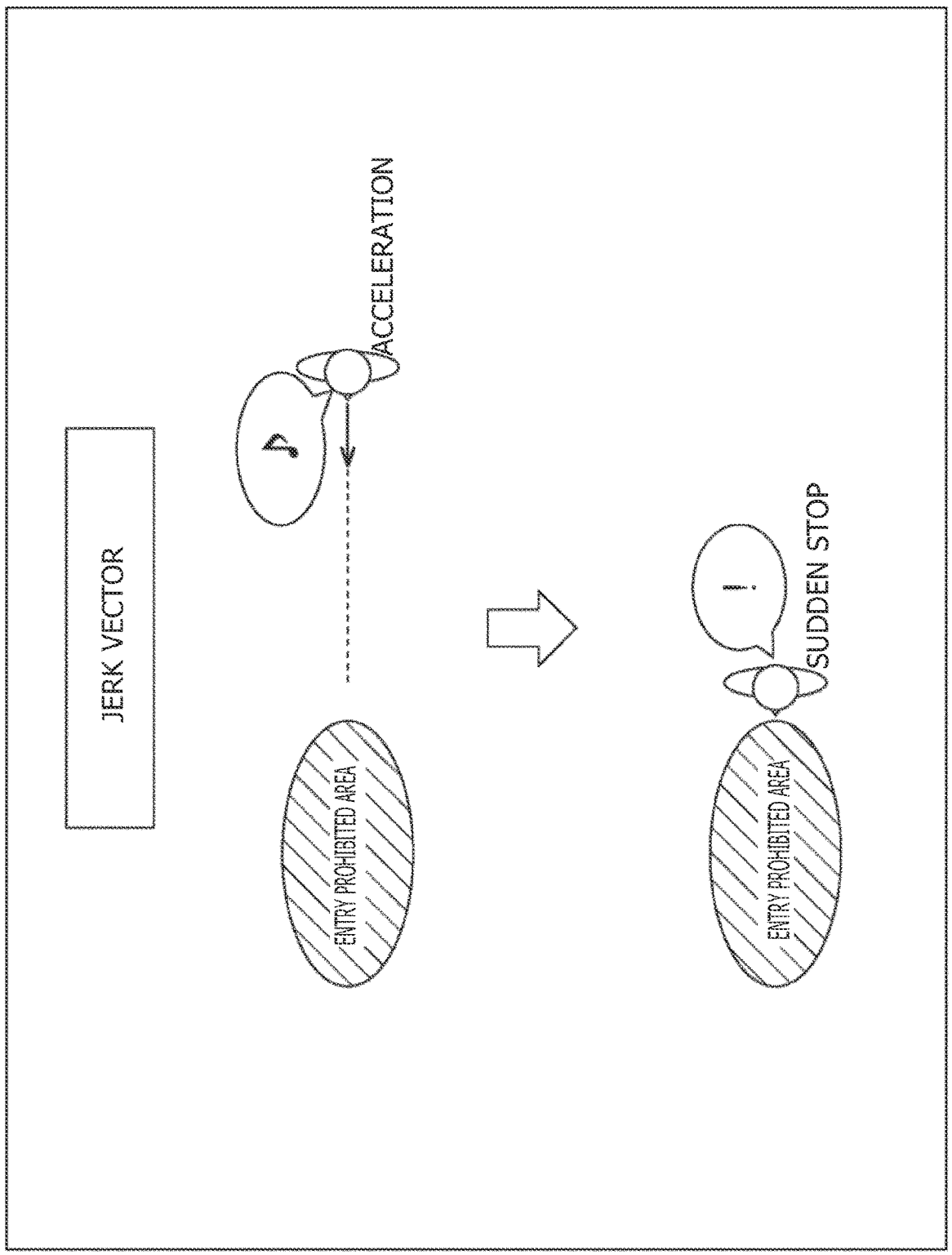
FIG. 4 is a diagram for illustrating a relation between a jerk vector and the person's recognition state.

FIG. 4 is a diagram for illustrating the relation between the jerk vector and the person's recognition state.

In a case where the entry prohibited area is recognized after approaching the entry prohibited area, a person stops suddenly as illustrated in the lower part of FIG. 4. In a case where the jerk vector in the direction (stopping direction) opposite to the travelling direction is large, it is estimated that the person's recognition state is in a state where the person has recognized the entry prohibited area located in the travelling direction just before.

The setting of the entry prohibited area by the control apparatus is performed on the basis of three pieces of information, i.e., the velocity vector, the acceleration vector, and the jerk vector that are considered to represent the person's recognition state.

Figure 5:
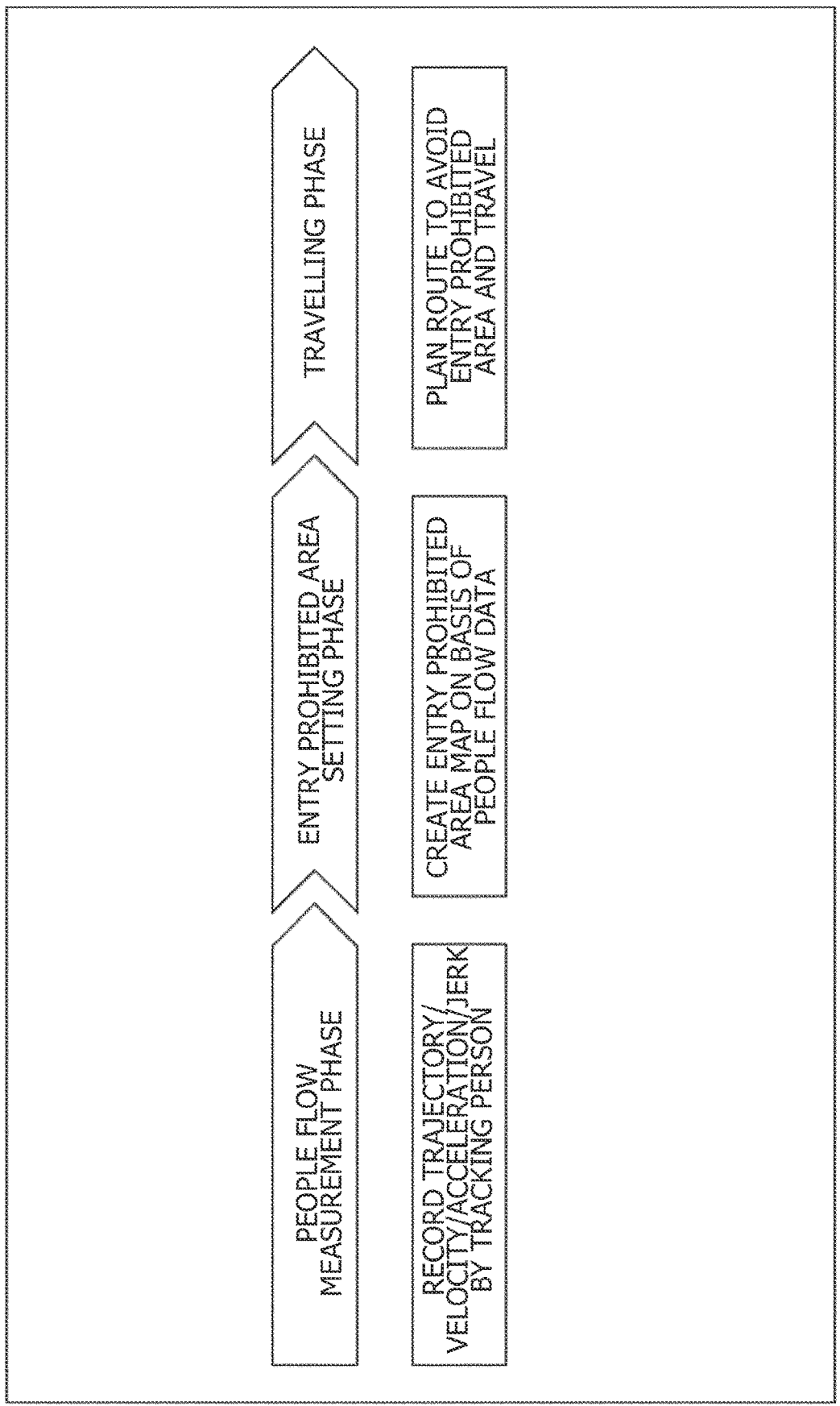
FIG. 5 is a diagram for illustrating the overall flow of processing performed by a control apparatus and the mobile robot.

FIG. 5 is a diagram for illustrating the overall flow of processing that includes phases of setting the entry prohibited area and is performed by the control apparatus and the mobile robot 1.

The overall processing performed by the control apparatus and the mobile robot 1 includes processing in each phase of a people flow measurement phase, an entry prohibited area setting phase, and a travelling phase.

The people flow measurement phase is a phase in which a person is tracked to record the trajectory, velocity, and acceleration that configure the people flow data.

The entry prohibited area setting phase is a phase in which an entry prohibited area map is generated on the basis of the people flow data on the premise of the above-described person's recognition. The entry prohibited area map includes information of the potential of each area in the space. The area with high potential is the entry prohibited area.

The travelling phase is a phase in which an action plan is performed so as to avoid the entry prohibited area on the basis of the entry prohibited area map and the mobile robot travels (moves) according to the planned trajectory.

For example, the people flow measurement phase and the entry prohibited area setting phase are phases that the control apparatus is responsible for. The travelling phase is a phase that the mobile robot 1 is responsible for.

The processing of the people flow measurement phase may be performed by an apparatus different from the control apparatus or may be performed by the mobile robot 1. The processing in all the phases of the people flow measurement phase, the entry prohibited area setting phase, and the travelling phase may be performed by the mobile robot 1.

The processing of one phase may be performed by a plurality of apparatuses in a shared manner. As described above, the apparatus for performing the processing of each phase can be appropriately changed. An example of the sharing of the processing in each phase will be described later.

As described above, it is possible to easily set a highly-reliable entry prohibited area by using the estimation result of the person's recognition state.

For example, in a case where the entry prohibited area is set by focusing only on the position of the person represented by walking data, there is a possibility that only the vicinity of the center of the space where people often walk is set as the passable area, but such a possibility can be prevented.

In addition, it is possible to prevent an area where a person enters by mistake from being set as the passable area.

Further, since the estimation result of the person's recognition state is used, it is also possible to set an area where an object that cannot be detected by a sensor or the like is present as the entry prohibited area.

It is possible to set the entry prohibited area in accordance with rules determined by people depending on the social background or the like. There is a place that people would not approach even though the mobile robot 1 can travel. By using the estimation result of the person's recognition state, it is possible to set such a place that people would not approach as the entry prohibited area of the mobile robot 1.

Even if the shape of a target obstacle does not change such as a case where an object on the shelf has changed or the state of the obstacle has changed, there is a case of changing the area to be set to the entry prohibited area or the passable area depending on the change of the state. Such a setting change can be performed on the basis of the person's recognition state.

Configuration Example of Each Apparatus

Figure 6:
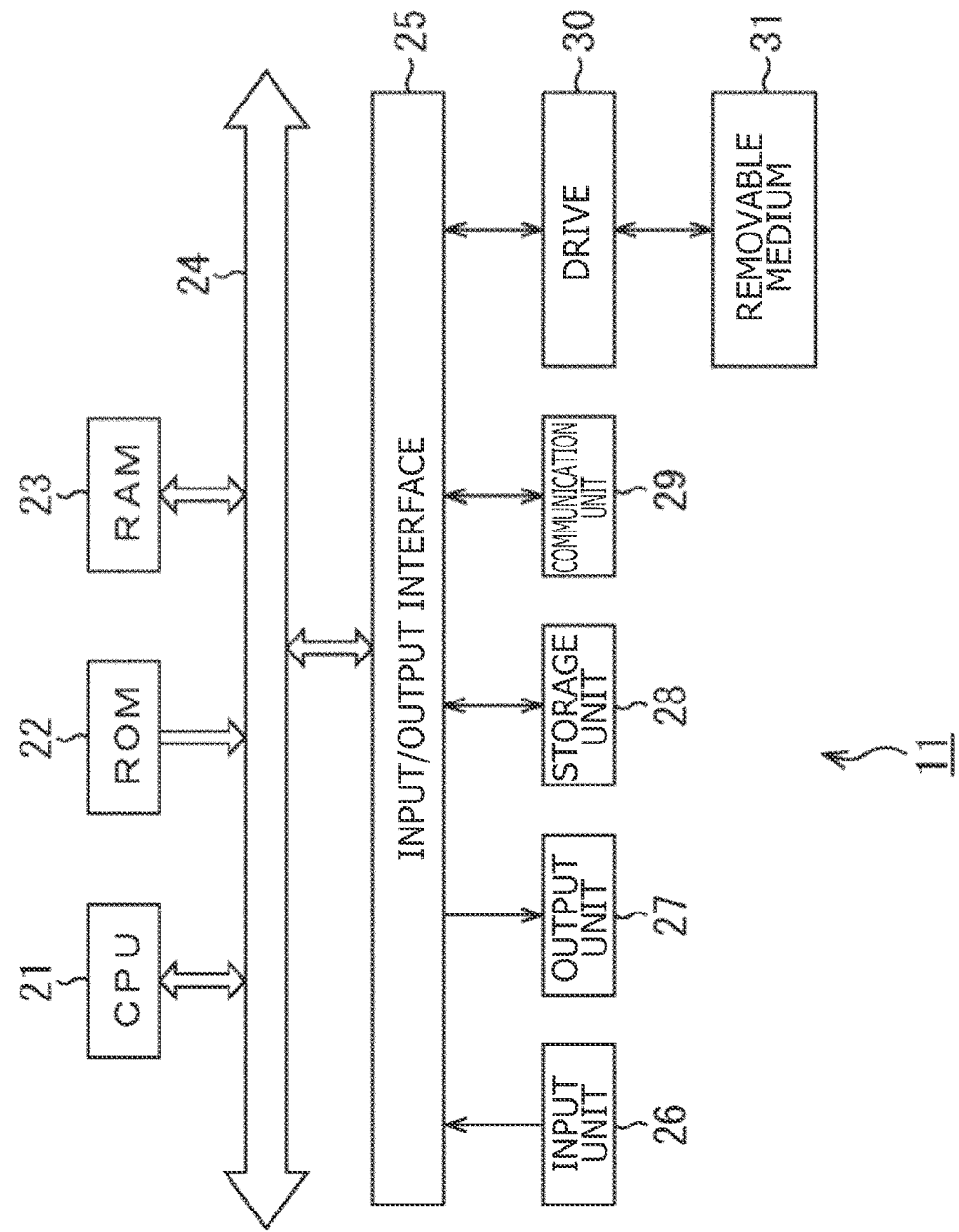
FIG. 6 is a block diagram for illustrating a configuration example of hardware of the control apparatus.

FIG. 6 is a block diagram for illustrating a configuration example of hardware of a control apparatus 11 for managing the movement of the mobile robot 1.

As illustrated in FIG. 6, the control apparatus 11 is configured using a computer. The control apparatus 11 and each mobile robot 1 are connected to each other via a network such as a wireless LAN or the Internet.

A CPU (Central Processing Unit) 21, a ROM (Read Only Memory) 22, and a RAM (Random Access Memory) 23 are mutually connected by a bus 24.

An input/output interface 25 is further connected to the bus 24. An input unit 26 including a keyboard, a mouse, and the like and an output unit 27 including a display, a speaker, and the like are connected to the input/output interface 25. In addition, a storage unit 28 including a hard disk, a nonvolatile memory, and the like, a communication unit 29 including a network interface and the like, and a drive 30 for driving a removable medium 31 are connected to the input/output interface 25.

In the computer configured as described above, for example, the CPU 21 loads a program stored in the storage unit 28 into the RAM 23 via the input/output interface 25 and the bus 24 and executes the program, so that processing including the above-described setting of the entry prohibited area is performed.

Figure 7:
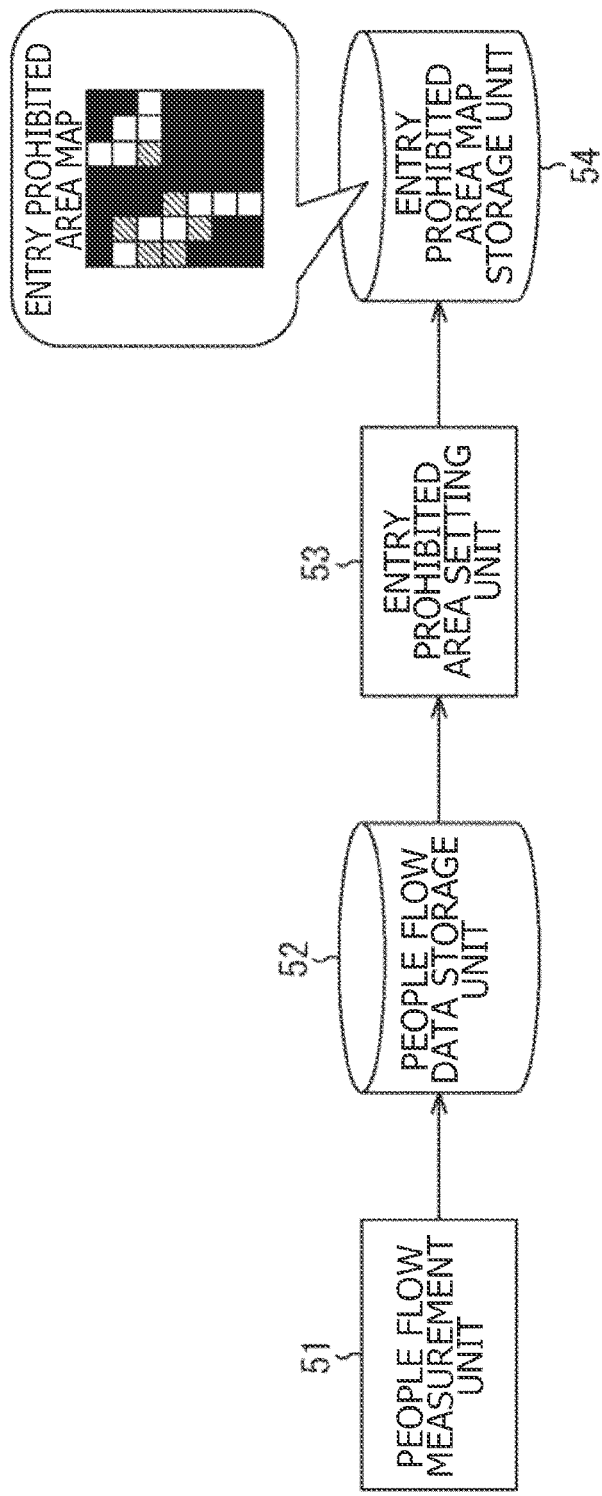
FIG. 7 is a block diagram for illustrating a functional configuration example of the control apparatus.

FIG. 7 is a block diagram for illustrating a functional configuration example of the control apparatus 11. At least a part of the functional units illustrated in FIG. 7 is realized by executing a predetermined program by the CPU 21 of FIG. 6.

In the control apparatus 11, a people flow measurement unit 51, a people flow data storage unit 52, an entry prohibited area setting unit 53, and an entry prohibited area map storage unit 54 are realized.

The people flow measurement unit 51 acquires an image photographed by a camera installed in the space where the mobile robot 1 is introduced. A person moving in the space is in the image photographed by the camera. The people flow measurement unit 51 analyzes the acquired image and generates the people flow data by tracking the person moving in the space. The people flow data may be generated on the basis of sensor data detected by a sensor other than a camera, such as a human detection sensor and a ToF (Time of Flight) sensor.

Figure 8:
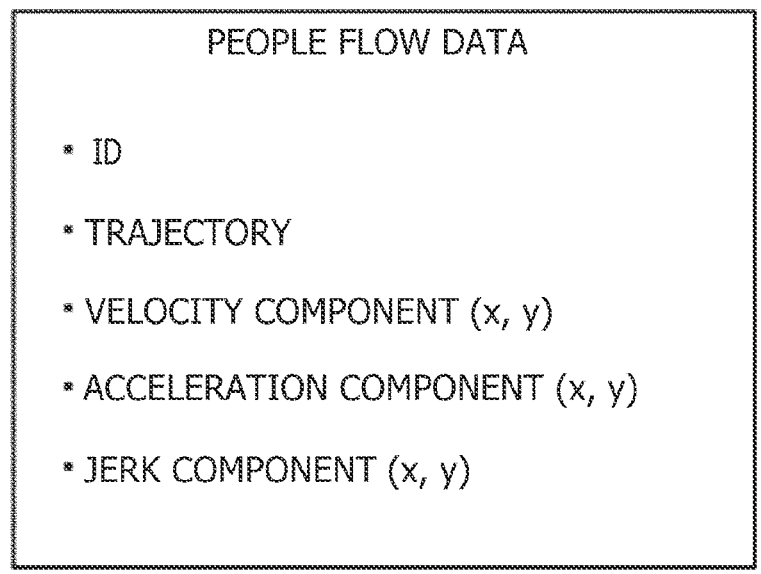
FIG. 8 is a diagram for illustrating an example of people flow data.

FIG. 8 is a diagram for illustrating an example of the people flow data.

The people flow data is generated for each person moving in the space. As illustrated in FIG. 8, the people flow data includes an ID, a trajectory, a velocity component, an acceleration component, and a jerk component.

The ID is identification information of a person moving in the space.

The trajectory represents the trajectory of the movement of the person. For example, the trajectory is represented by time-series data of a position in the space.

The velocity component represents the velocity of the person moving in the space. The velocity of a component (x, y) in each direction is represented by the velocity component on the basis of the X-axis and Y-axis directions set in the space.

The acceleration component represents the acceleration of the person moving in the space. The acceleration of a component (x, y) in each direction is represented by the acceleration component on the basis of the X-axis and Y-axis directions set in the space.

The jerk component represents the jerk of the person moving in the space. The jerk of a component (x, y) in each direction is represented by the jerk component on the basis of the X-axis and Y-axis directions set in the space.

Other information used to set the entry prohibited area may be generated by the people flow measurement unit 51 and included in the people flow data. The acceleration and the jerk are not included in the people flow data, and the acceleration and the jerk may be calculated on the basis of the velocity included in the people flow data.

The people flow measurement unit 51 outputs and stores such people flow data including each information to the people flow data storage unit 52 (FIG. 7). A DB of the people flow data is constructed in the people flow data storage unit 52. Processing of constructing the DB of the people flow data is performed as processing of the people flow measurement phase.

The entry prohibited area setting unit 53 estimates the person's recognition state as described above on the basis of the people flow data stored in the people flow data storage unit 52. The entry prohibited area setting unit 53 sets the entry prohibited area on the basis of the estimation result of the person's recognition state and generates an entry prohibited area map.

Figure 9:
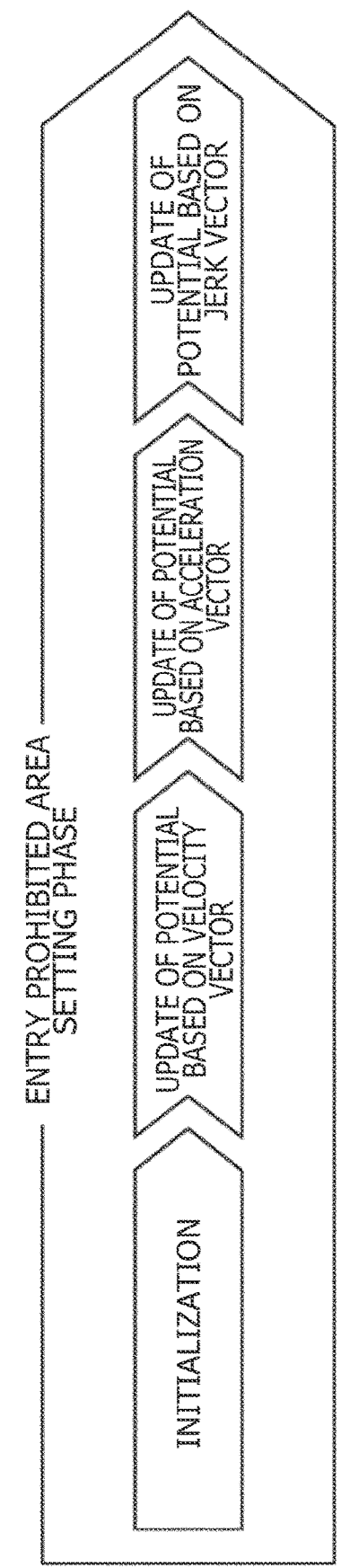
FIG. 9 is a diagram for illustrating the flow of processing in an entry prohibited area setting phase.

FIG. 9 is a diagram for illustrating the flow of processing of the entry prohibited area setting phase performed by the entry prohibited area setting unit 53.

The processing of the entry prohibited area setting phase includes each processing of initialization, an update of the potential based on the velocity vector, an update of the potential based on the acceleration vector, and an update of the potential based on the jerk vector.

Figure 10:
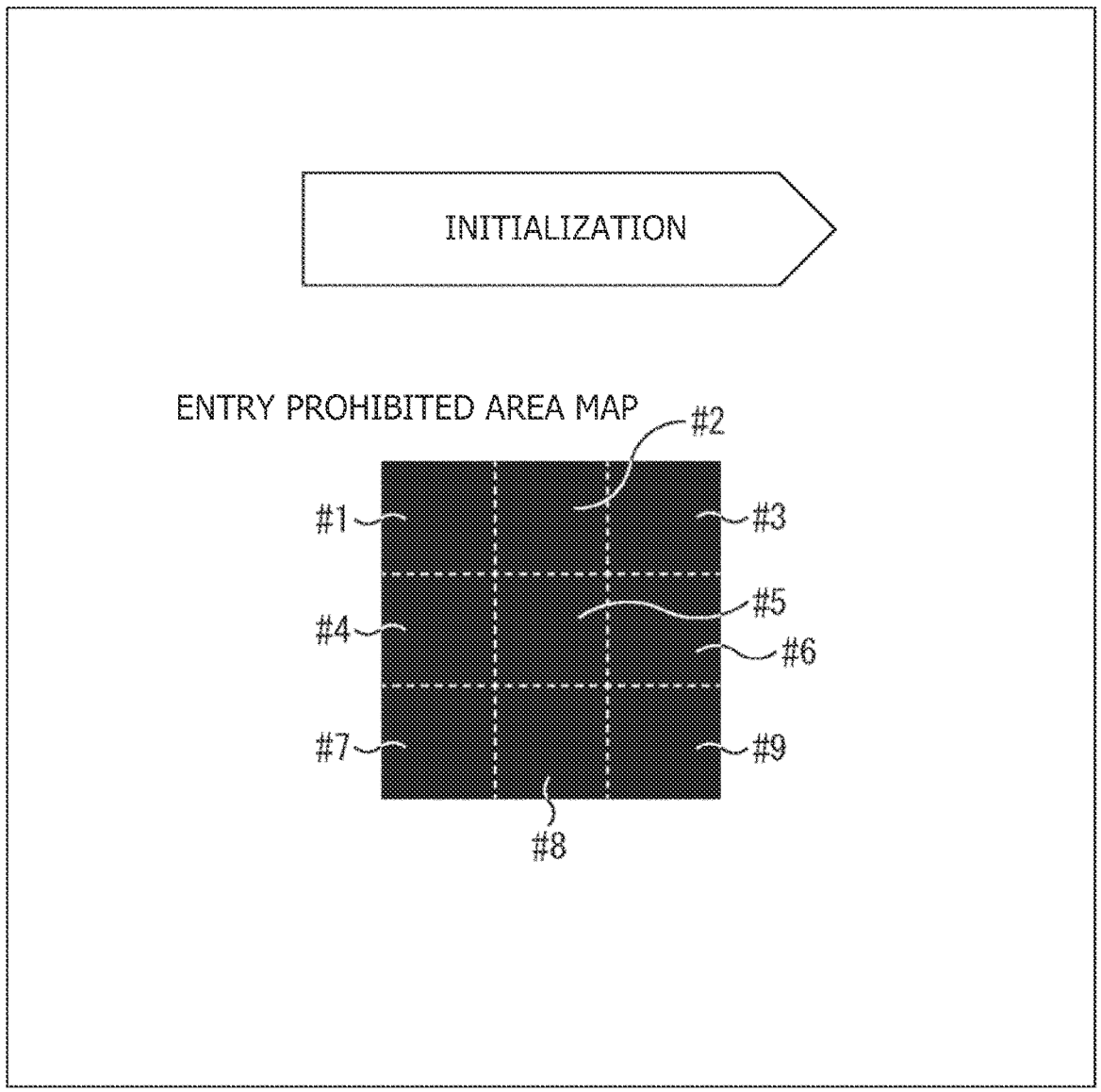
FIG. 10 is a diagram for illustrating an example of initialization.

FIG. 10 is a diagram for illustrating an example of the initialization.

At the time of initialization, the entry prohibited area setting unit 53 sets the maximum potential of areas #1 to #9 that are all the areas in the space. In the state after the initialization, all the areas #1 to #9 are set as the entry prohibited areas. At the time of the action planning by the mobile robot 1, the action plan is performed so as to move in the areas with low potential.

In FIG. 10, the whole space is configured using the nine areas of the areas #1 to #9, but the shape of the entry prohibited area map and the number of areas configuring the entry prohibited area map differ according to the shape of the space and the size of the space. The color density of each area represents the potential. An area with high density is an area with high potential. The same applies to FIG. 11 and the diagrams that follow.

Figure 11:
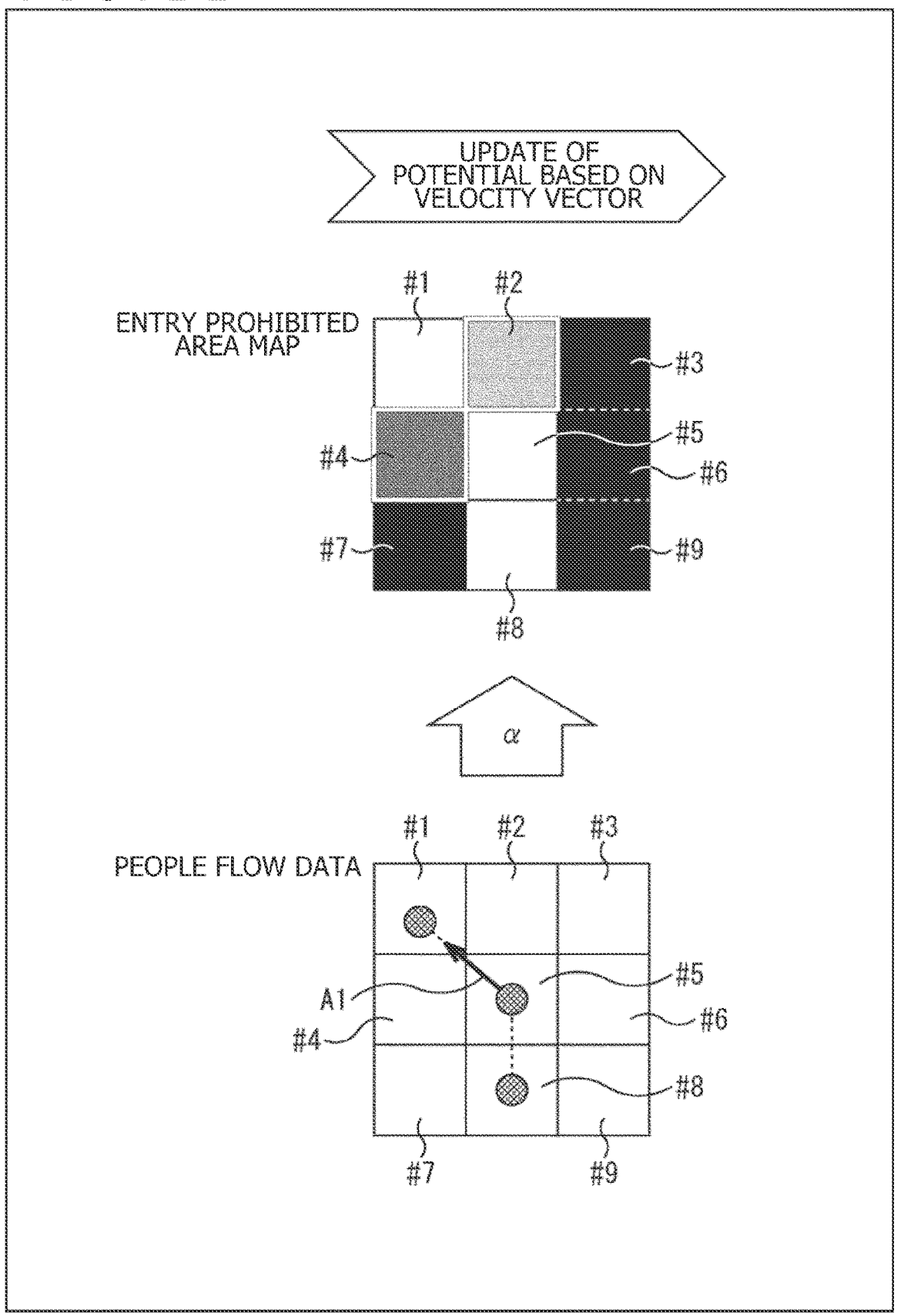
FIG. 11 is a diagram for illustrating an example of an update of potential based on a velocity vector.

FIG. 11 is a diagram for illustrating an example of the update of the potential based on the velocity vector.

As described with reference to FIG. 2, it is rare for a person who recognizes an area serving as the entry prohibited area to move in the normal direction to the entry prohibited area. Therefore, the update of the potential based on the velocity vector is performed in such a manner that the potential in the areas in the component directions (the X-axis direction and the Y-axis direction) of the velocity vector is reduced in proportion to the vector length.

For example, as illustrated in the lower part of FIG. 11, it is assumed that there is people flow data representing that a person moved from the area #8 to the area #5, and then from the area #5 towards the area #1. It is assumed that the person whose movement state is represented by the people flow data suddenly stopped when advancing from the area #8 to the area #5, changed the direction, and moved from the area #5 to the area #1. The velocity vector in the area #5 measured by such a movement is represented by an arrow A1.

In this case, the potential of the area #2 and area #4 located in the component directions of the velocity vector represented by the arrow A1 is updated so as to reduce in proportion to the vector lengths in the Y-axis direction and the X-axis direction, respectively. In the upper part of FIG. 11, the lower density of the area #2 and area #4 surrounded by the void thick frames than the density illustrated in FIG. 10 represents that the potential of each area is lowered and updated.

A weight parameter α representing the contribution ratio of the velocity is used in the update of the potential based on the velocity vector. The degree of updating the potential in the area #2 and area #4 is calculated on the basis of the vector length and the weight parameter α.

Even in the update of the potential based on the acceleration vector and the update of the potential based on the jerk vector, a weight parameter β representing the contribution ratio of the acceleration and a weight parameter γ representing the contribution ratio of the jerk are used, respectively. As the weight parameters α, β, and γ, predetermined values are set.

It should be noted that the potential of each of the area #1, area #5, and area #8 is updated to, for example, the minimum potential in proportion to the vector length of the velocity vector. In the upper part of FIG. 11, illustration of the area #1, area #5, and area #8 in white represents that the minimum values are set as the potential of these areas.

Following the update based on the velocity vector, the update of the potential based on the acceleration vector is performed.

Figure 12:
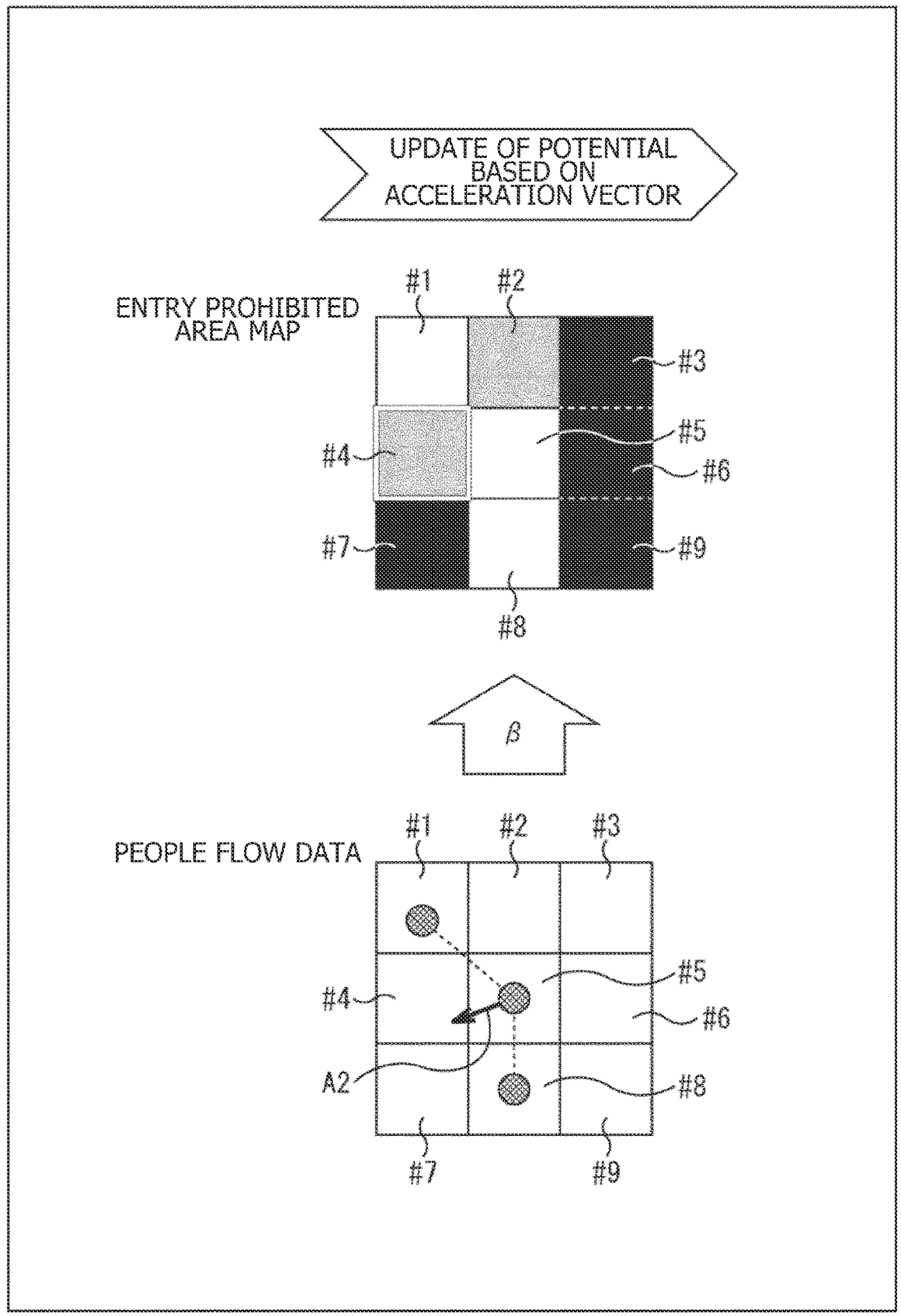
FIG. 12 is a diagram for illustrating an example of an update of the potential based on an acceleration vector.

FIG. 12 is a diagram for illustrating an example of the update of the potential based on the acceleration vector.

As described with reference to FIG. 3, a person decelerates when approaching the recognized entry prohibited area. Therefore, the update of the potential based on the acceleration vector is performed in such a manner that the potential in the areas located in the component directions of the acceleration vector is reduced in proportion to the vector length.

The acceleration vector in the area #5 measured by the above-described movement is represented by, for example, an arrow A2 in the lower part of FIG. 12.

In this case, the potential of the area #4 located in the component directions of the acceleration vector represented by the arrow A2 is updated so as to reduce in proportion to, for example, the vector length. The degree of updating the potential in the area #4 is calculated on the basis of the vector length and the weight parameter β. In the upper part of FIG. 12, the lower density of the area #4 surrounded by the void thick frame than the density illustrated in FIG. 11 represents that the potential of the area #4 is lowered and updated.

Following the update based on the acceleration vector, the update of the potential based on the jerk vector is performed.

Figure 13:
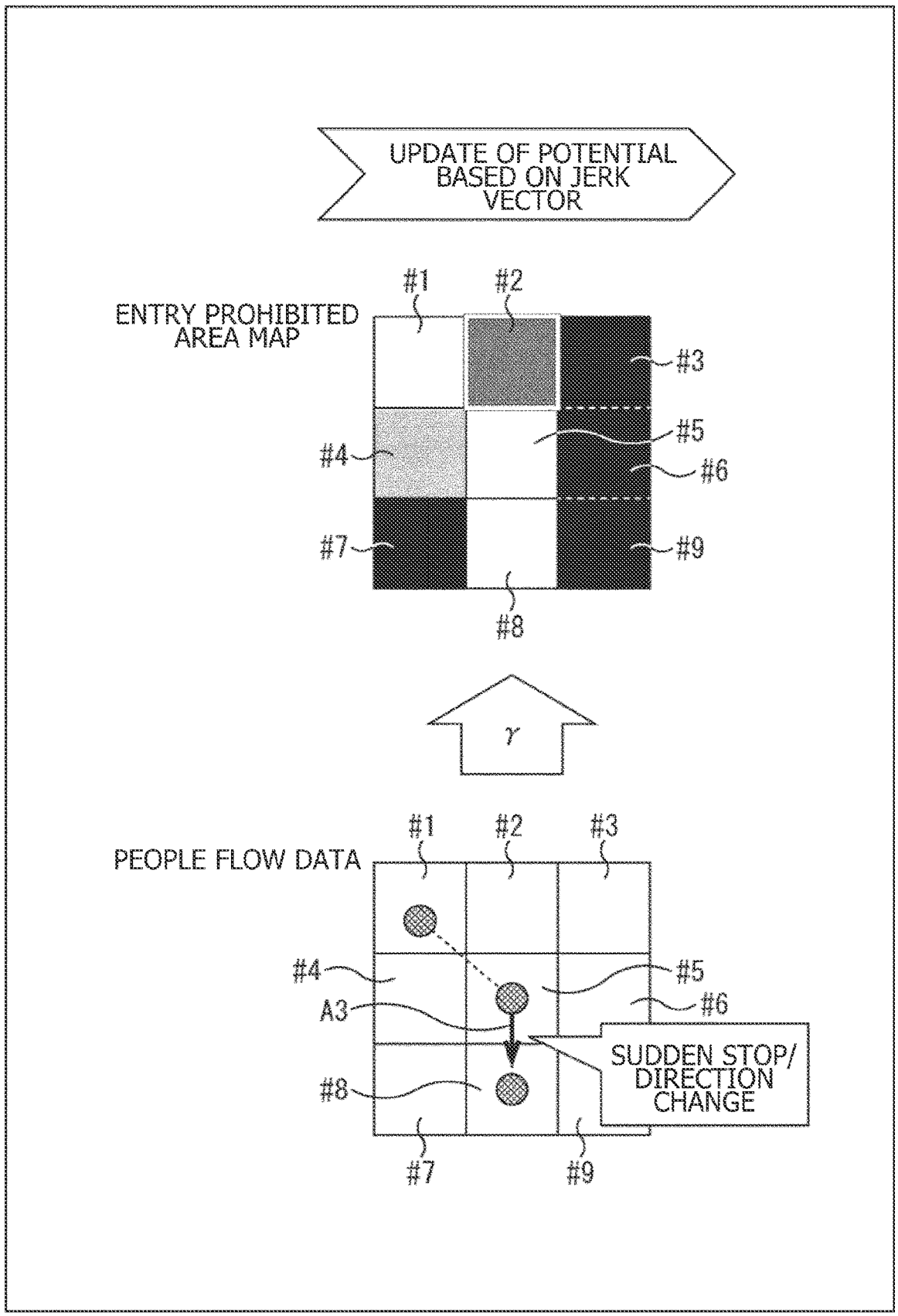
FIG. 13 is a diagram for illustrating an example of an update of the potential based on a jerk vector.

FIG. 13 is a diagram for illustrating an example of the update of the potential based on the jerk vector.

As described with reference to FIG. 4, in a case where the entry prohibited area is recognized after approaching the entry prohibited area, a person suddenly stops. Therefore, the update of the potential based on the jerk vector is performed so as to increase the potential in the areas located in the advancing direction (the direction opposite to the direction of the jerk vector).

The direction of the jerk vector in the area #5 measured by the above-described movement is represented by, for example, an arrow A3 in the lower part of FIG. 13.

In this case, the potential of the area #2 located in the advancing direction immediately before the sudden stop is updated so as to increase according to, for example, the vector length. The degree of updating the potential in the area #2 is calculated on the basis of the weight parameter γ. In the upper part of FIG. 13, the higher density of the area #2 surrounded by the void thick frame than the density illustrated in FIG. 12 represents that the potential of the area #2 is increased and updated.

The potential of each area of the entry prohibited area map is updated as described above on the basis of the velocity vector, the acceleration vector, and the jerk vector represented by each people flow data. The entry prohibited area setting unit 53 of FIG. 7 functions as a parameter setting unit for setting the potential that is a parameter of each area used in the action planning of the mobile robot 1 on the basis of the person's recognition state during movement estimated by the people flow data.

The entry prohibited area map generated by the entry prohibited area setting unit 53 by setting the potential of each area is output to and stored in the entry prohibited area map storage unit 54. As illustrated in the balloon of FIG. 7, the entry prohibited area map is a grid map in which a potential gradient reflecting information of an obstacle is set in each grid (area) configuring the space.

The entry prohibited area map stored in the entry prohibited area map storage unit 54 is transmitted to each mobile robot 1 and used in the action planning.

Configuration of Mobile Robot 1

FIG. 14 is a block diagram for illustrating a configuration example of the mobile robot 1.

The mobile robot 1 is configured using a control unit 101, a moving unit 102, a camera 103, a sensor 104, a communication unit 105, and a power supply unit 106.

The control unit 101 is configured using a computer. The control unit 101 executes a predetermined program by the CPU to control the overall operation of the mobile robot 1.

The moving unit 102 rotates tires by driving a motor and a gear according to the control by the control unit 101, and realizes the movement of the mobile robot 1 while adjusting the speed and the direction.

The camera 103 is configured using an RGB camera for photographing an RGB image, an IR camera for photographing an IR image, or the like. The image photographed by the camera 103 is output to the control unit 101.

The sensor 104 is configured using various sensors such as an acceleration sensor, a gyro sensor, a human detection sensor, an encoder for detecting the rotational amount of the tires provided in the moving unit 102, and LiDAR. Information representing the sensing result by the sensor 104 is output to the control unit 101.

At least one of the camera 103 or the sensor 104 may be provided outside the mobile robot 1. In this case, an image photographed by the camera provided outside the mobile robot 1 and the information representing the sensing result by the sensor are transmitted to the mobile robot 1 via wireless communication.

The communication unit 105 performs wireless communication with the control apparatus 11. For example, the communication unit 105 receives the entry prohibited area map transmitted from the control apparatus 11 and outputs the same to the control unit 101.

The power supply unit 106 has a battery. The power supply unit 106 supplies power to each unit of the mobile robot 1.

In the control unit 101, an action planning unit 111 and a movement control unit 112 are realized by executing a predetermined program. Processing of the travelling phase of FIG. 5 is performed by the action planning unit 111 and the movement control unit 112.

The action planning unit 111 plans various actions of the mobile robot 1. For example, the action planning unit 111 performs an action plan so as to move while avoiding the entry prohibited area on the basis of the entry prohibited area map generated by the control apparatus 11. Information of the trajectory obtained by the action plan is supplied to the movement control unit 112.

In the action plan, the potential of each area may be used as it is, or the potential after binarization using a threshold value may be used. For example, an area where potential equal to or larger than the threshold value is set is treated as the entry prohibited area.

The movement control unit 112 drives the moving unit 102 to move the mobile robot 1 according to the trajectory obtained by the action plan by the action planning unit 111.

As described above, since the potential is set on the basis of the estimation result of the person's recognition state, the control apparatus 11 can easily set a highly-reliable entry prohibited area.

In addition, the mobile robot 1 can move while more securely avoiding the entry prohibited area on the basis of the highly-reliable entry prohibited area.

First Embodiment: Basic Form

In the people flow measurement phase, the movement of a person in the space is tracked. The tracking of the movement of the person may be performed by using a sensing system installed in the space including a camera, or may be performed by using an internal camera mounted on the mobile robot 1.

In the entry prohibited area setting phase, the potential is updated on the basis of the method described with reference to FIG. 9 to FIG. 13, and the entry prohibited area map is generated.

In the travelling phase, the action plan is performed using the entry prohibited area map. The use form of the entry prohibited area map is appropriately changed according to the algorithm of the action plan. For example, an action plan based on a potential gradient or an action plan using a method such as RRT (Rapidly Exploring Random Tree) or A* for a black and white image binarized with a threshold value as a reference is performed.

Second Embodiment: Countermeasure to Case of Incorrect Potential Update

In a case where the potential is updated by focusing on the person's recognition state, even in a case where a person recognizes that there is another person and avoids the person, the potential is updated as if he/she avoids an obstacle. The people flow data may be invalidated in such a manner that the action in response to such interference by another person is not reflected on the update of the potential.

Figure 15:
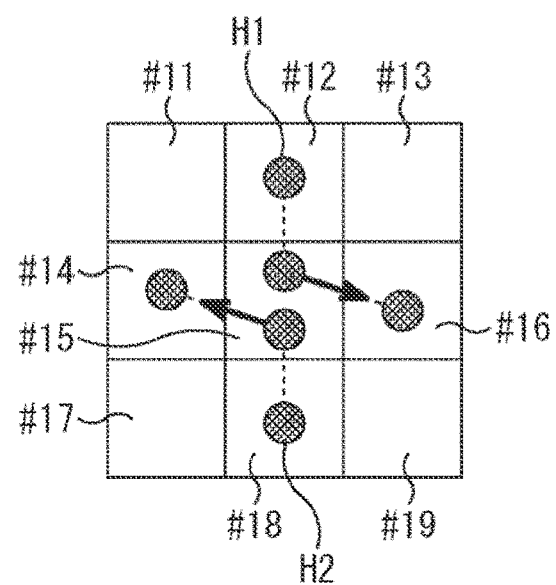
FIG. 15 is a diagram for illustrating an example of the people flow data.

FIG. 15 is a diagram for illustrating an example of the people flow data.

FIG. 15 illustrates the trajectory of a person H1 having moved from the area #12 to the area #15 and the trajectory of a person H2 having moved from the area #18 to the area #15. The person H1 moves from the area #15 towards the area #16 so as to avoid the person H2 located ahead. As similar to the above, the person H2 moves from the area #15 towards the area #14 so as to avoid the person H1 located ahead. It is assumed that there is no obstacle or the like in the space configured using the areas #11 to #19.

In a case where the potential is updated by focusing on the person's recognition state, such an avoidance action is reflected on the update of the potential even though there is no obstacle.

In the entry prohibited area setting unit 53 of the control apparatus 11, in a case where many people exist in a certain range, the potential is not updated on the basis of the people flow data of the many people. That is, the people flow data is treated as invalid and is not used to update the potential. In other words, people flow data in a case where the number of people existing in a certain range is less than a predetermined number is used to estimate the person's recognition state, and the potential is updated on the basis of the estimated person's recognition state.

Accordingly, it is possible to update the potential by utilizing the measured people flow data in a situation where a certain number of people coexist.

Third Embodiment: Setting of Weight Parameter According to Environment

Figure 16:
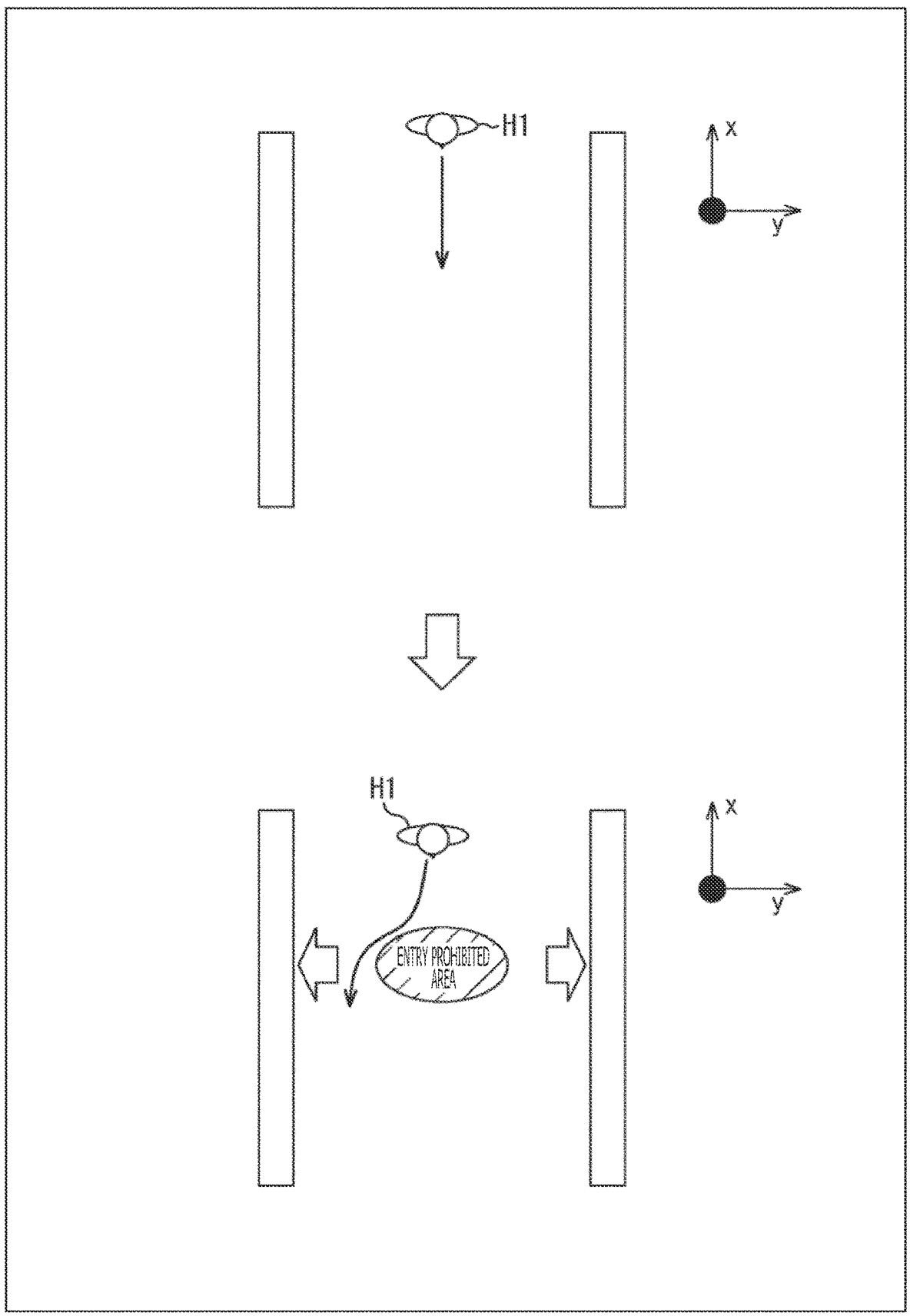
FIG. 16 is a plan view for illustrating an example of a space.

FIG. 16 is a plan view for illustrating an example of a space.

The space illustrated in the upper part of FIG. 16 is a space such as a passage in which the direction of the movement of a person is uniform. There are walls on both sides of the passage. In the example of FIG. 16, the person H1 moves towards the lower direction.

In a case where the potential is updated on the basis of the people flow data measured in such a space, the movement in the short-side direction (Y-axis direction) is considered to have a larger correlation with the presence of the prohibited area than the movement in the longitudinal direction (X-axis direction) because a person tries to avoid a facing object as much as possible. That is, as illustrated in the lower part of FIG. 16, a specific area in the passage is easily set as the entry prohibited area.

In this case, a weight (bias) is set for an element used to update the potential according to the characteristics of the space. In the entry prohibited area setting unit 53 of the control apparatus 11, the potential is updated in consideration of the weight.

For example, the same weight parameters $\alpha$, $\beta$, and $\gamma$ are not set for each of the movement in the X-axis direction and the movement in the Y-axis direction, but different weight parameters $\alpha$, $\beta$, and $\gamma$ are set for each of the movement in the X-axis direction and the movement in the Y-axis direction according to the space shape.

In the case of the example of FIG. 16, when focusing on, for example, the weight parameter $\alpha$ representing the contribution ratio of the velocity vector, a weight parameter $\alpha_y$ according to the movement in the Y-axis direction is set larger than a weight parameter $\alpha_x$ according to the movement in the X-axis direction. Accordingly, it is possible to provide the update of the potential based on the velocity vector with a characteristic that the update of the potential is performed more sensitively according to the movement in the Y-axis direction.

As described above, in the entry prohibited area setting unit 53, a weight parameter according to a characteristic of a space where a person moves, such as a shape is set, and the potential is updated.

Fourth Embodiment: Automatic Adjustment of Weight Parameter Using Additional Information The weighting parameters $\alpha$, $\beta$, and $\gamma$ used in the update of the potential may be adjusted on the basis of additional information obtained by sensing.

As described above, the weight parameter $\alpha$ is a parameter used to update the potential on the basis of the velocity vector. The weight parameter $\beta$ is a parameter used to update the potential on the basis of the acceleration vector. The weight parameter $\gamma$ is a parameter used to update the potential on the basis of the jerk vector.

For example, the weight parameter is adjusted according to the age of a moving person. In this case, the additional information used to adjust the weight parameter is a result of estimating the age. In the people flow measurement phase, the age of a moving person is estimated by analyzing an image photographed by a camera.

In a case where the moving person is an elderly person, the recognition of the person tends to depend on the judgment of conditions in the vicinity due to the deterioration of the eyesight, the recognition function, and the physical function, and the like. In this case, a small value is set as the value of the weight parameter $\beta$, and an adjustment is made in such a manner that the movement by prior judgment is hardly reflected on the update of the potential. In addition, small values are set as all the values of the weight parameters $\alpha$, $\beta$, and $\gamma$, and an adjustment is made in such a manner that all the movements are hardly reflected on the update of the potential.

On the other hand, in a case where the moving person is a young person, the reliability of the judgment of situations is high because all of the eyesight, the recognition function, and the physical function are high. In this case, large values are set as all the values of the weight parameters $\alpha$, $\beta$, and $\gamma$, and an adjustment is made in such a manner that all the movements are easily reflected on the update of the potential.

In addition, the weight parameter is adjusted according to the line of sight of the moving person. In this case, the additional information used to adjust the weight parameter is the face direction. Here, the direction of the line of sight coincides with the direction of the face. In the people flow measurement phase, the direction of the face of the moving person is detected by analyzing an image photographed by a camera.

In general, a person visually recognizes the entry prohibited area, and then starts an avoidance action. In a case where the direction of the velocity vector does not coincide with the direction of the line of sight, it is conceivable that there is a high possibility of taking an avoidance action while following the entry prohibited area recognized immediately before with the eyes.

A large value is set as the value of the weight parameter $\alpha$ used in the update of the potential based on the velocity vector, and an adjustment is made in such a manner that the moving velocity is easily reflected on the update of the potential.

As described above, in the entry prohibited area setting unit 53 of the control apparatus 11, the weight parameter is adjusted by using the characteristics of a moving person, such as the age and the line of sight, as additional information, and the potential is updated by using the adjusted weight parameter. By using the additional information, the entry prohibited area setting unit 53 can reflect a more accurate and detailed recognition state on the setting of the entry prohibited area.

Fifth Embodiment: Three-Dimensional Countermeasure by Considering Posture of Person In addition to the processing using the velocity, acceleration, and jerk on the XY plane, the similar processing is also performed in the vertical direction (Z-axis direction), so that it is possible to generate an entry prohibited area map of a three-dimensional space.

In this case, in the people flow measurement phase, a bone shape in the three-dimensional space is estimated in addition to the detection of the position on the XY plane. In addition, as illustrated in FIG. 17, for example, the head and the toes are detected as specific parts of the moving person on the basis of the estimated result of the bone shape.

Figure 17:
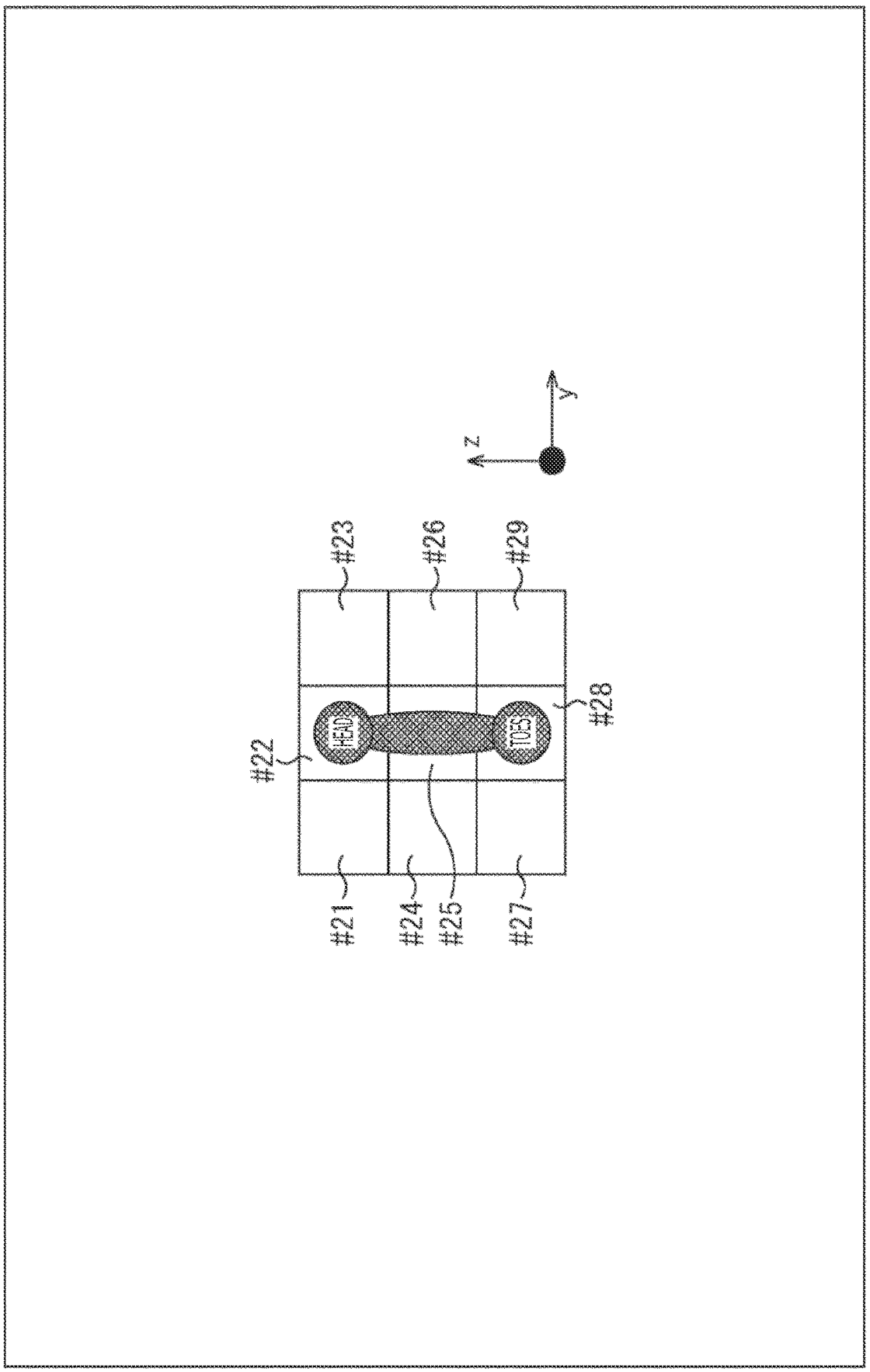
FIG. 17 is a diagram for illustrating an example of estimating a bone shape in a three-dimensional space.

In the example of FIG. 17, the positions of the head and the toes on the YZ plane are detected. In the people flow measurement phase, people flow data including the velocity, acceleration, and jerk of the head and the velocity, acceleration, and jerk of the toes are measured on the basis of such a detection result.

The person's recognition state is estimated on the basis of such people flow data, and the potential is updated in a manner similar to the processing on the XY plane, so that, for example, an avoidance action such as lowering the head in a case where there is an obstacle over the head is reflected on the update of the potential of each area on the three-dimensional space. It should be noted that the potential of the area #25 in FIG. 17 between the head and the toes is updated so as to be the passable area.

As described above, it is possible to update the potential of each area on the three-dimensional space on the basis of the estimation result of the person's recognition state. By using the entry prohibited area map on the three-dimensional space, it is possible to apply the present technique to an action plan in a case where a flying object such as a generally-called drone moves and an action plan for a robot arm and the like. That is, the present technique can be applied to not only to the action plan for the mobile robot 1 moving on a plane but also to an action plan for a robot moving on a three-dimensional space.

Other

Although it is assumed that the mobile robot 1 is a robot that moves by using tires, the present technique can also be applied to a case where a humanoid robot capable of walking on two legs and an animal-shaped robot capable of walking on four legs are used. That is, the present technique can be applied to action plans for various mobile objects including a robots, a drone, a robot arm, and an automobile.

Although it is assumed that the parameter of each area updated on the basis of the estimation result of the person's recognition state is potential used in the potential method, other parameters used in the action plan may be set on the basis of the estimation result of the person's recognition state.

In the above description, although it is assumed that the processing of the people flow measurement phase and the entry prohibited area setting phase is performed by the control apparatus 11 and the processing of the travelling phase is performed by the mobile robot 1, the combination of apparatuses in charge of the processing of each phase can be optionally changed.

Figure 18:
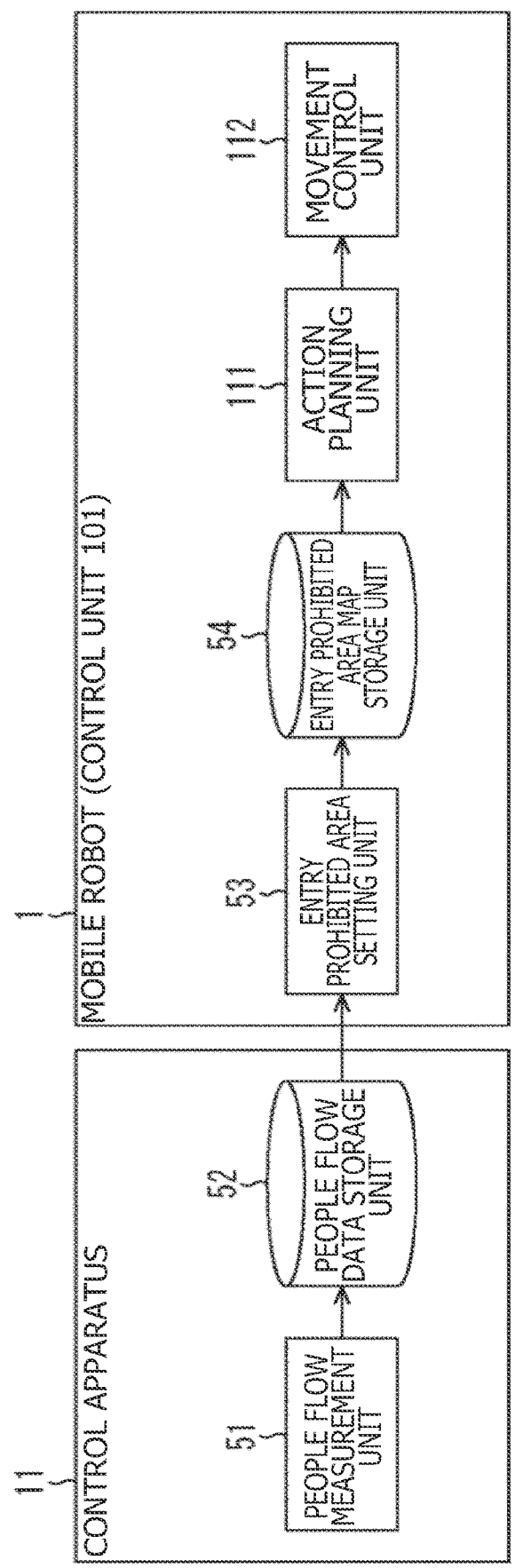
FIG. 18 is a block diagram for illustrating another configuration example of an information processing system.
Figure 19:
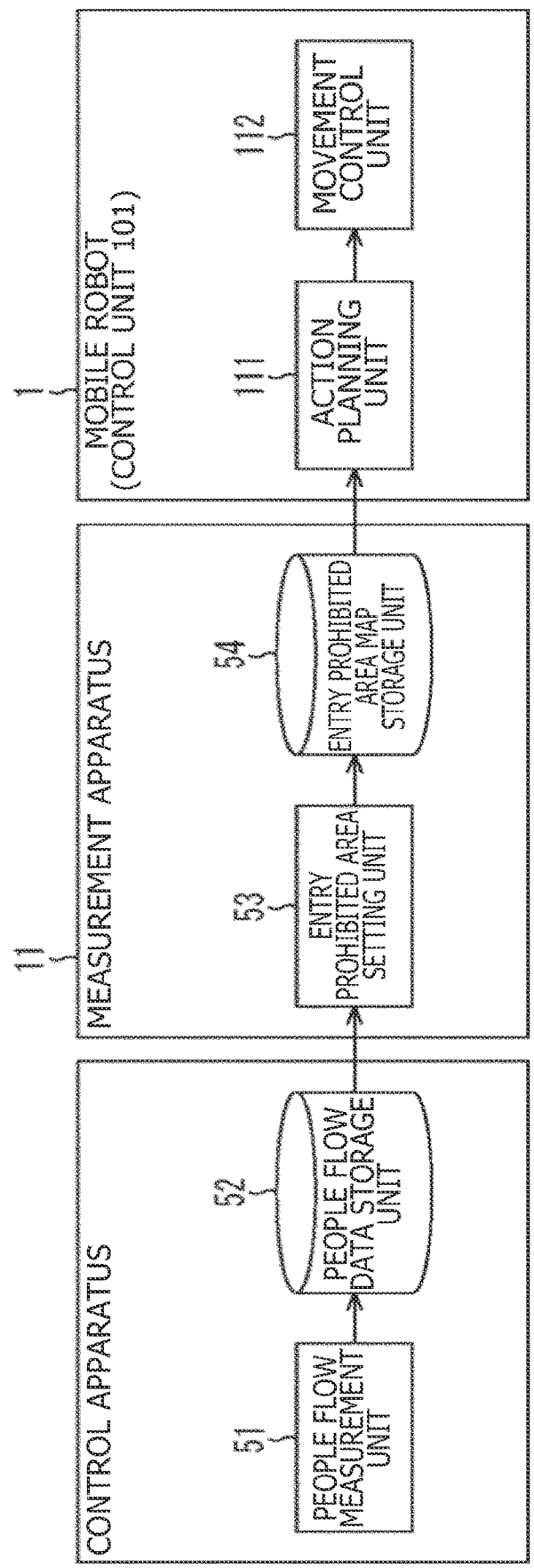
FIG. 19 is a block diagram for illustrating another configuration example of the information processing system.

FIG. 18 to FIG. 20 are block diagrams each illustrating another configuration example of an information processing system.

In the example of FIG. 18, the people flow measurement unit 51 and the people flow data storage unit 52 are provided in the control apparatus 11, and the entry prohibited area setting unit 53, the entry prohibited area map storage unit 54, the action planning unit 111, and the movement control unit 112 are provided in the mobile robot 1. The configuration of the information processing system illustrated in FIG. 18 is a configuration in a case where the processing of the people flow measurement phase is performed by the control apparatus 11, and the processing of the entry prohibited area setting phase and the travelling phase is performed by the mobile robot 1.

In the example of FIG. 19, the people flow measurement unit 51 and the people flow data storage unit 52 are provided in a measurement apparatus, the entry prohibited area setting unit 53 and the entry prohibited area map storage unit 54 are provided in the control apparatus 11, and the action planning unit 111 and the movement control unit 112 are provided in the mobile robot 1. The configuration of the information processing system illustrated in FIG. 19 is a configuration in a case where the processing of the people flow measurement phase is performed by the measurement apparatus, the processing of the entry prohibited area setting phase is performed by the control apparatus 11, and the processing of the travelling phase is performed by the mobile robot 1.

As described above, the processing of the people flow measurement phase can be performed by apparatuses other than the mobile robot 1 and the control apparatus 11.

In the example of FIG. 20, the people flow measurement unit 51, the people flow data storage unit 52, the entry prohibited area setting unit 53, the entry prohibited area map storage unit 54, the action planning unit 111, and the movement control unit 112 are provided in the mobile robot 1. The configuration of the information processing system illustrated in FIG. 20 is a configuration in a case where the processing of all the phases of the people flow measurement phase, the entry prohibited area setting phase, and the travelling phase is performed by the mobile robot 1. The mobile robot 1 functions as an information processing apparatus that performs the processing of all the phases of the people flow measurement phase, the entry prohibited area setting phase, and the travelling phase.

About Programs

The series of processes described above can be executed by hardware or software. In a case where the series of processes is executed by software, a program configuring the software is installed in a computer incorporated in dedicated hardware, a general-purpose personal computer, or the like.

The program to be installed is provided by being recorded in the removable medium 31 illustrated in FIG. 6 such as an optical disk (CD-ROM (Compact Disc-Read Only Memory), DVD (Digital Versatile Disc), or the like) or a semiconductor memory. In addition, the program may be provided via a wired or wireless transmission medium such as a local area network, the Internet, or digital broadcasting. The program can be installed in advance in the ROM 22 or the storage unit 28.

The program executed by the computer may be a program in which processing is performed in time series according to the order described in the specification, or a program in which processing is performed in parallel or at a necessary timing such as when being called.

The effects described in the specification are illustrative only and are not limited, and other effects may be present.

The embodiments of the present technique are not limited to the above-described embodiments, and various modifications can be made without departing from the gist of the present technique.

For example, the present technique can have a configuration of cloud computing in which one function is processed jointly in a shared manner by a plurality of apparatuses via a network.

In addition, each of the steps described in the above flowchart can be executed not only by one apparatus, but also by a plurality of apparatuses in a shared manner.

Further, in a case where a plurality of processes is included in one step, the plurality of processes included in the one step can be executed not only by one apparatus, but also by a plurality of apparatuses in a shared manner.

Example of Combination of Configurations

The present technique can also have the following configuration.

(1)
An information processing apparatus including:
a parameter setting unit that sets a parameter of each area used for an action plan for a mobile object on the basis of a person's recognition state during movement estimated by people flow data.

(2)
The information processing apparatus according to (1),
in which the parameter setting unit estimates the person's recognition state on the basis of a velocity included in the people flow data together with a trajectory of movement.

(3)
The information processing apparatus according to (2),
in which the parameter setting unit estimates the person's recognition state on the basis of an acceleration and a jerk included in the people flow data together with the trajectory of the movement.

(4)
The information processing apparatus according to (3),
in which the parameter setting unit updates the parameter of an area located in a component direction of a velocity vector on the basis of the velocity vector represented by the people flow data.

(5)
The information processing apparatus according to (4),
in which the parameter setting unit updates the parameter of an area located in the component direction of an acceleration vector on the basis of the acceleration vector represented by the people flow data.

(6)
The information processing apparatus according to (5),
in which the parameter setting unit updates the parameter of an area located in a direction opposite to the component direction of a jerk vector on the basis of the jerk vector represented by the people flow data.

(7)
The information processing apparatus according to (6),
in which the parameter includes potential used in a case where the action plan is performed by a potential method, and
the parameter setting unit
performs an update of the potential based on the velocity vector and an update of the potential based on the acceleration vector so as to reduce the potential, and
performs an update of the potential based on the jerk vector so as to increase the potential.

(8)
The information processing apparatus according to any one of (1) to (7),
in which the parameter setting unit sets the parameter on the basis of the person's recognition state during movement estimated by the people flow data in a case where the number of people existing in a certain range is less than a predetermined number.

(9)
The information processing apparatus according to (6) or (7),
in which the parameter setting unit sets a weight representing a degree of update of the parameter based on each of the velocity vector, the acceleration vector, and the jerk vector on the basis of a shape of a space where a person moves.

(10)
The information processing apparatus according to any one of (1) to (9),
in which the parameter setting unit adjusts a degree of update of the parameter on the basis of additional information according to characteristics of a person during movement.

(11)
The information processing apparatus according to any one of (1) to (10),
in which the parameter setting unit estimates the person's recognition state on the basis of a velocity and acceleration included in the people flow data together with a trajectory of a movement of a specific part of a person on a three-dimensional space, and sets the parameter of each area configuring the three-dimensional space.

(12)
The information processing apparatus according to any one of (1) to (11), further including:
a people flow measurement unit that detects a person during movement on the basis of sensor data and generates the people flow data.

(13)
The information processing apparatus according to any one of (1) to (12), further including:
an action planning unit that performs the action plan on the basis of map information that is information of an area where the parameter is set.

(14)
An information processing method executed by an information processing apparatus, including:
setting a parameter of each area used for an action plan for a mobile object on the basis of a person's recognition state during movement estimated by people flow data.

(15)
A program that causes a computer to execute:
processing of setting a parameter of each area used for an action plan for a mobile object on the basis of a person's recognition state during movement estimated by people flow data.

REFERENCE SIGNS LIST

1-1 to 1-3: Mobile robot
11: Control apparatus
51: People flow measurement unit
52: People flow data storage unit
53: Entry prohibited area setting unit
54: Entry prohibited area map storage unit
101: Control unit
102: Moving unit
103: Camera
104: Sensor
105: Communication unit
111: Action planning unit
112: Movement control unit

The invention claimed is:
1. An information processing apparatus, comprising:
a central processing unit (CPU) configured to:
estimate a recognition state of a person of a plurality of persons based on people flow data, wherein
the people flow data corresponds to movement of the plurality of persons in a certain range in a space, and
a count of the plurality of persons in the certain range is less than a specific number; and
set a parameter of each area of a plurality of areas associated with an action plan for a mobile object, wherein the parameter is set based on the recognition state of the person, and the plurality of areas corresponds to the certain range in the space.

2. The information processing apparatus according to claim 1, wherein the people flow data includes a velocity of the person, and the CPU is further configured to estimate the recognition state of the person based on a trajectory of the movement and the velocity of the person.

3. The information processing apparatus according to claim 2, wherein the people flow data further includes an acceleration of the person and a jerk of the person, and the CPU is further configured to estimate the recognition state of the person based on the acceleration of the person and the jerk of the person.

4. The information processing apparatus according to claim 3, wherein the CPU is further configured to update the parameter of a first area of the plurality of areas based on a velocity vector represented by the people flow data, the velocity vector corresponds to the velocity of the person, and the first area is in a component direction of the velocity vector.

5. The information processing apparatus according to claim 4, wherein the CPU is further configured to update the parameter of a second area of the plurality of areas based on an acceleration vector represented by the people flow data, the acceleration vector corresponds to the acceleration of the person, and the second area is in a component direction of the acceleration vector.

6. The information processing apparatus according to claim 5, wherein the CPU is further configured to update the parameter of a third area of the plurality of areas based on a jerk vector represented by the people flow data, and the jerk vector corresponds to the jerk of the person, and the third area is in a direction opposite to a component direction of the jerk vector.

7. The information processing apparatus according to claim 6, wherein the parameter for each area of the plurality of areas includes a potential of a corresponding area of the plurality of areas, and the CPU is further configured to:
reduce the potential based on the velocity vector and the acceleration vector; and
increase the potential based on the jerk vector.

8. The information processing apparatus according to claim 6, wherein the CPU is further configured to:
set a weight based on a shape of the space, and
the weight represents a degree of the update of the parameter.

9. The information processing apparatus according to claim 1, wherein the CPU is further configured to adjust, based on additional information, a degree of update of the parameter, and the additional information corresponds to characteristics of the person during the movement.

10. The information processing apparatus according to claim 1, wherein the people flow data includes a velocity of the person and an acceleration of the person, and the CPU is further configured to:
estimate the recognition state of the person based on the velocity, the acceleration and a trajectory of a movement of a specific part of the person; and
set the parameter of a set of areas of the plurality of areas, wherein the set of areas corresponds to a three-dimensional space.

11. The information processing apparatus according to claim 1, wherein the CPU is further configured to:
detect the person based on sensor data; and
generate the people flow data.

12. The information processing apparatus according to claim 1, wherein the CPU is further configured to perform the action plan based on map information that is information of a specific area of the plurality of areas where the parameter is set.

13. An information processing method, comprising:
in an information processing apparatus:
estimating a recognition state of a person of a plurality of persons based on people flow data, wherein
the people flow data corresponds to movement of the plurality of persons in a certain range in a space, and
a count of the plurality of persons in the certain range is less than a specific number; and
setting a parameter of each area of a plurality of areas associated with an action plan for a mobile object, wherein
the parameter is set based on the recognition state of the person, and
the plurality of areas corresponds to the certain range in the space.

14. A non-transitory computer-readable medium having stored thereon, computer-executable instructions which, when executed by a computer, cause the computer to execute operations, the operations comprising:
estimating a recognition state of a person of a plurality of persons based on people flow data, wherein
the people flow data corresponds to movement of the plurality of persons in a certain range in a space, and
a count of the plurality of persons in the certain range is less than a specific number; and
setting a parameter of each area of a plurality of areas associated with an action plan for a mobile object, wherein
the parameter is set based on the recognition state of the person, and
the plurality of areas corresponds to the certain range in the space.

* * * * *